(12) United States Patent
Spedding

(10) Patent No.: US 9,228,687 B2
(45) Date of Patent: Jan. 5, 2016

(54) WATER HAMMER ARRESTER

(75) Inventor: Isaac Spedding, Mudgeeraba (AU)

(73) Assignee: FLUID KINNECT PTY. LTD., Mudgeeraba, Queensland (AU)

( * ) Notice: Subject to any disclaimer, the term of this patent is extended or adjusted under 35 U.S.C. 154(b) by 92 days.

(21) Appl. No.: 13/980,541

(22) PCT Filed: Jan. 20, 2012

(86) PCT No.: PCT/AU2012/000044
§ 371 (c)(1),
(2), (4) Date: Jul. 18, 2013

(87) PCT Pub. No.: WO2012/097414
PCT Pub. Date: Jul. 26, 2012

(65) Prior Publication Data
US 2013/0299029 A1    Nov. 14, 2013

(30) Foreign Application Priority Data
Jan. 21, 2011   (AU) ............................... 2011900191

(51) Int. Cl.
*F16L 55/04* (2006.01)
*F16L 55/045* (2006.01)
*E03B 7/07* (2006.01)

(52) U.S. Cl.
CPC ............. *F16L 55/045* (2013.01); *E03B 7/075* (2013.01)

(58) Field of Classification Search
CPC ........ F16L 55/043; F16L 55/045; F16L 55/05
USPC .................................................... 138/30, 31
See application file for complete search history.

(56) References Cited

U.S. PATENT DOCUMENTS

| | | | | |
|---|---|---|---|---|
| 2,417,873 A | * | 3/1947 | Huber | 138/31 |
| 2,715,419 A | * | 8/1955 | Ford et al. | 138/31 |
| 2,864,403 A | | 12/1958 | Deily et al. | |
| 3,364,950 A | * | 1/1968 | Zajdler | 138/31 |
| 3,735,777 A | * | 5/1973 | Katzer et al. | 137/514.5 |
| 3,880,193 A | * | 4/1975 | Lewis | 138/26 |
| 3,984,504 A | * | 10/1976 | Pick | 261/76 |
| 4,667,699 A | | 5/1987 | Loliger | |
| 5,740,837 A | * | 4/1998 | Chiang | 138/45 |

(Continued)

FOREIGN PATENT DOCUMENTS

| | | |
|---|---|---|
| DE | 3816349 | 11/1989 |
| FR | 67285 | 2/1958 |
| GB | 2104595 | 3/1983 |

OTHER PUBLICATIONS

EP Search Report in corresponding EP Application No. 12736118.6, dated 10/10/214.

(Continued)

*Primary Examiner* — James Hook
(74) *Attorney, Agent, or Firm* — Kagan Binder, PLLC

(57) ABSTRACT

A water hammer arrester for installation into a water pipeline, the water hammer arrester including an inlet for receiving water from the water pipeline, an outlet for returning the water to the water pipeline, a body connecting the inlet and the outlet, and a piston assembly positioned in the body to allow water to flow from the inlet to the outlet between the piston assembly and the body, wherein the piston assembly is adapted to absorb pressure variations in the water pipeline to thereby at least partially reduce water hammer in the water pipeline in use.

15 Claims, 19 Drawing Sheets

(56) References Cited

U.S. PATENT DOCUMENTS

| | | | |
|---|---|---|---|
| 5,907,134 A * | 5/1999 | Nording et al. | 181/228 |
| 6,062,265 A * | 5/2000 | Head | 138/111 |
| 6,095,195 A * | 8/2000 | Park et al. | 138/31 |
| 6,154,961 A * | 12/2000 | Park et al. | 29/890.14 |
| 2004/0173259 A1* | 9/2004 | Bailey | 137/119.05 |
| 2010/0288388 A1* | 11/2010 | Barale et al. | 138/31 |

OTHER PUBLICATIONS

International Search Report, International Application No. PCT/AU2012/000044, mailed Feb. 13, 2012.

International Preliminary Report on Patentability International Application No. PCT/AU2012/000044, mailed May 7, 2013.

\* cited by examiner

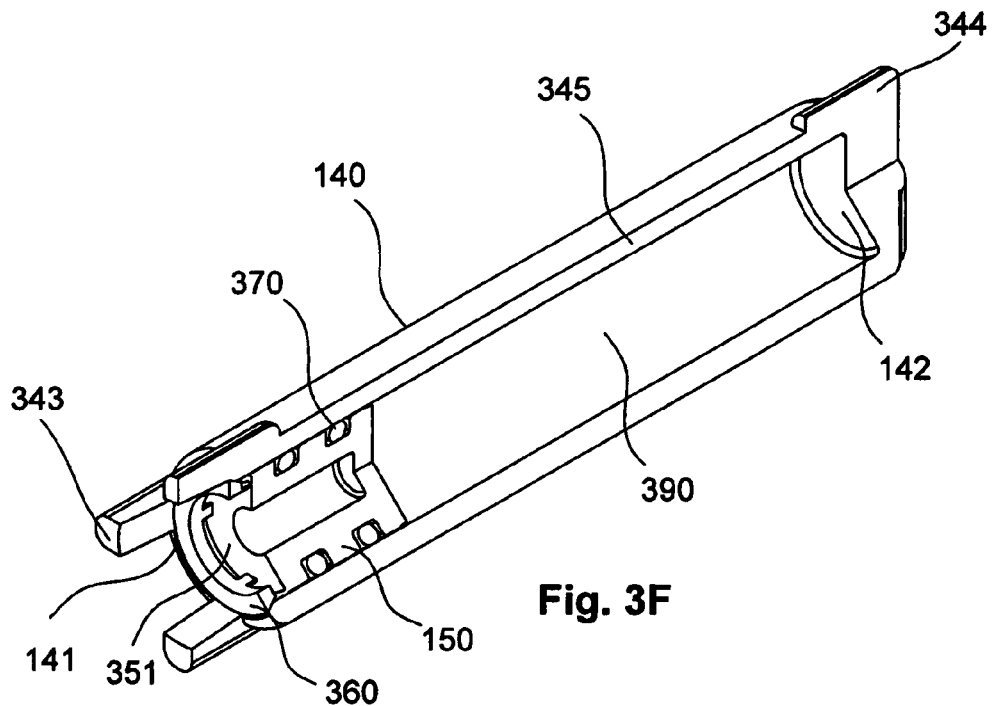
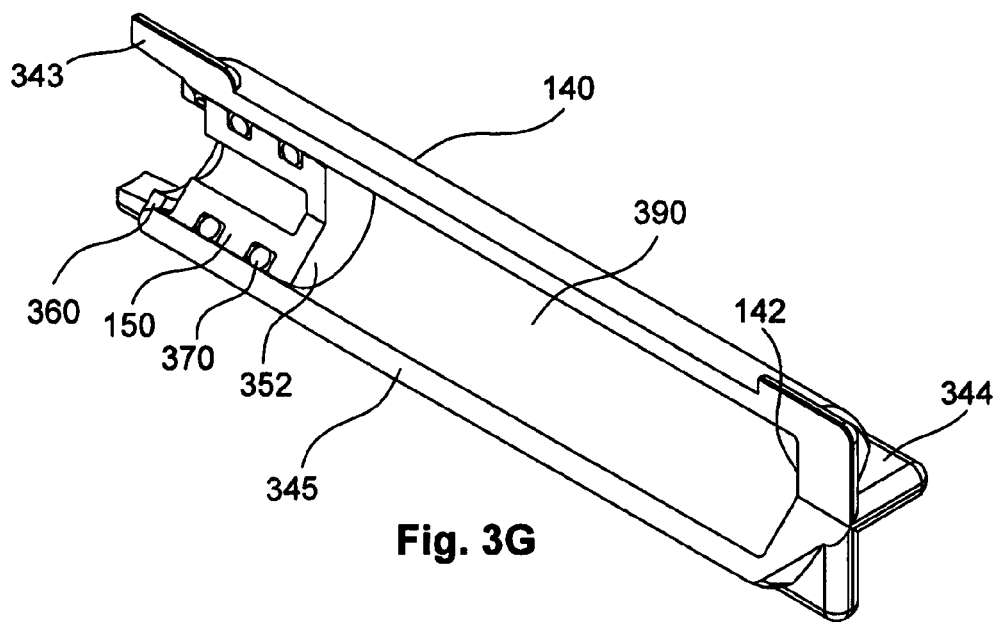

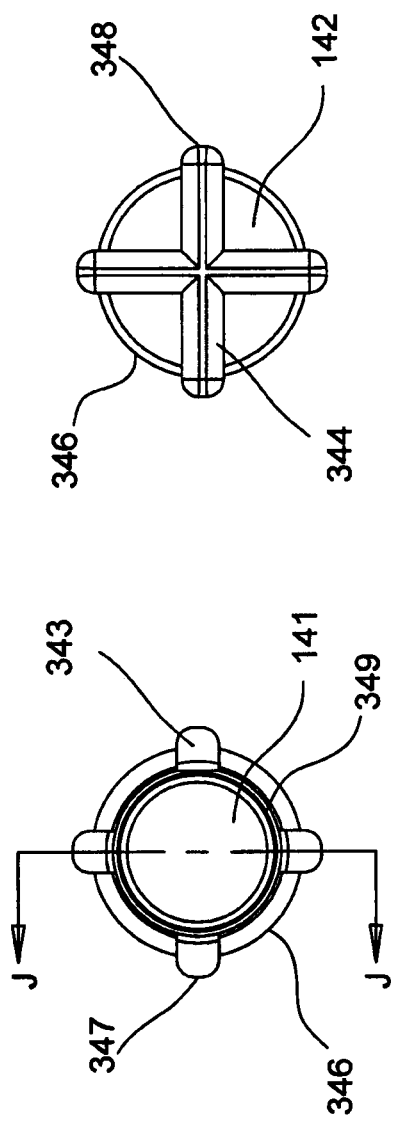
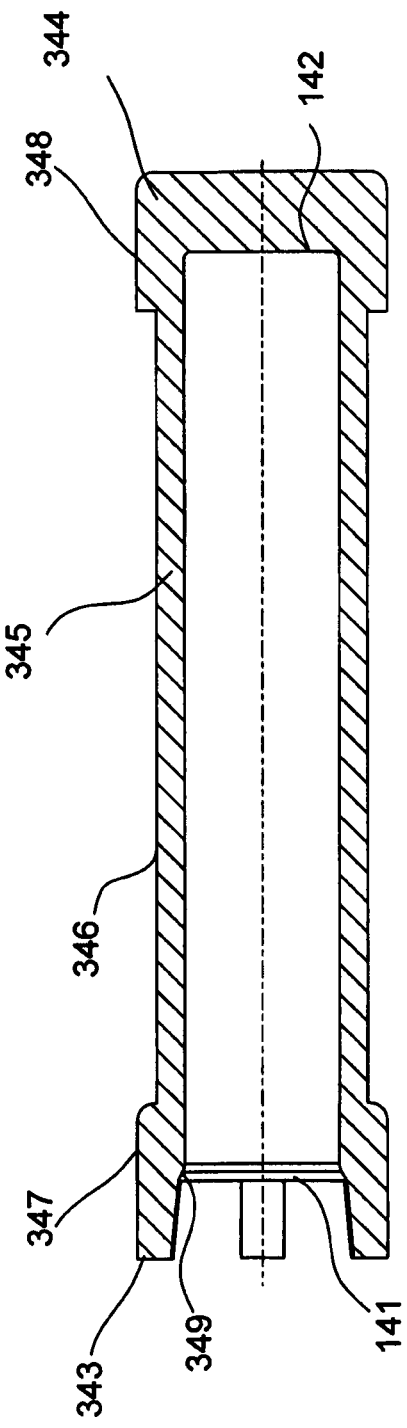

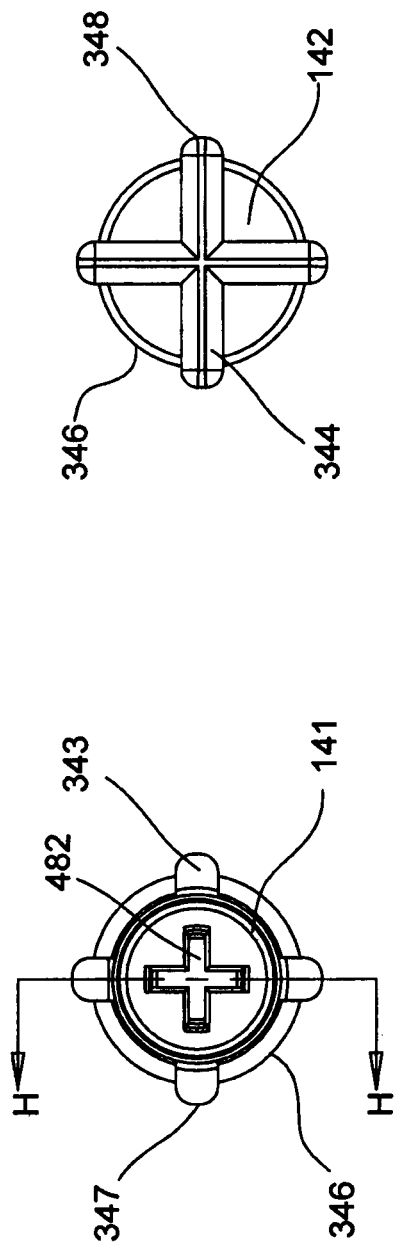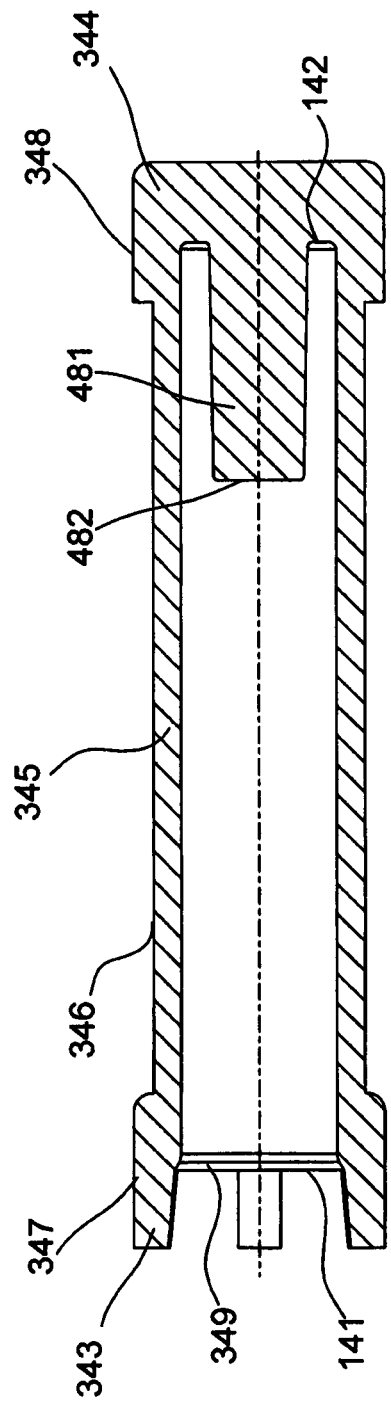

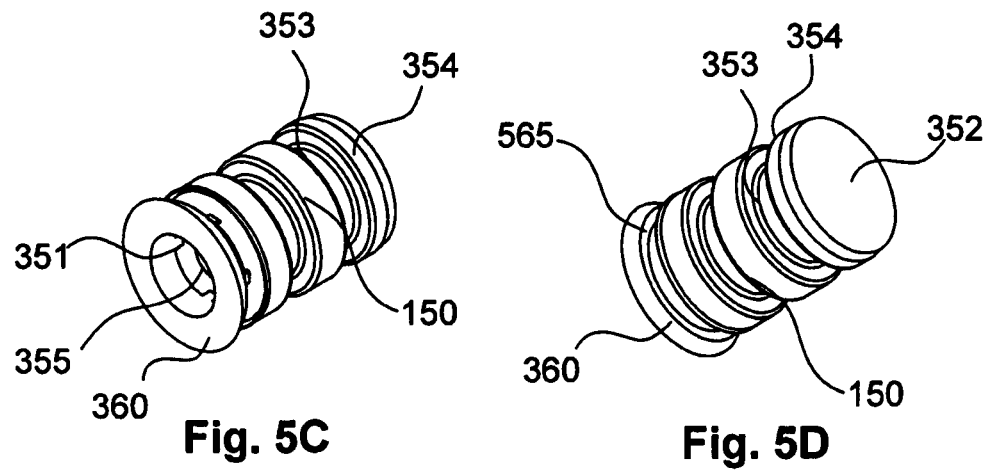
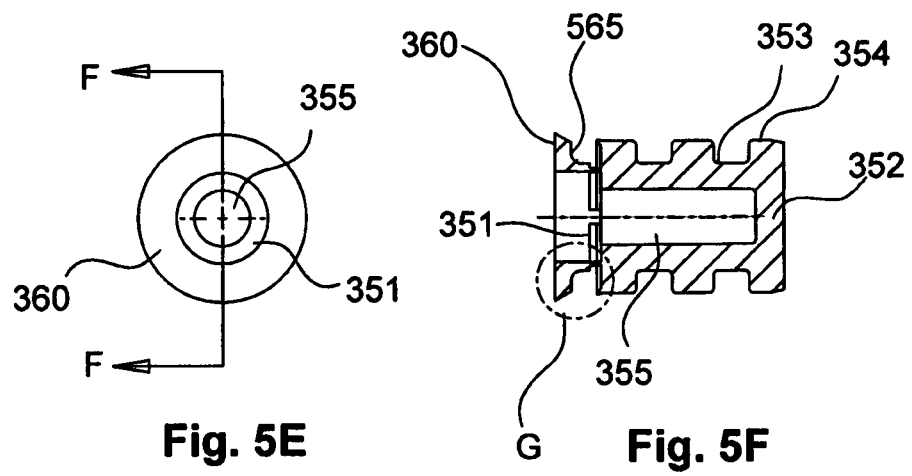
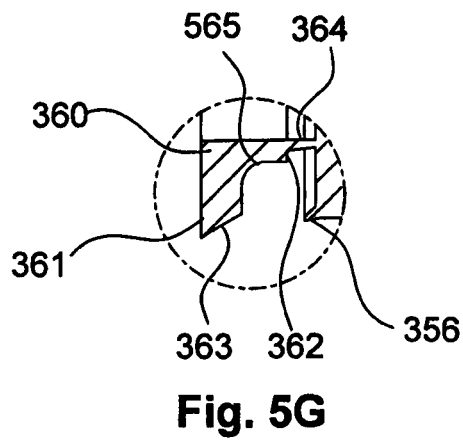

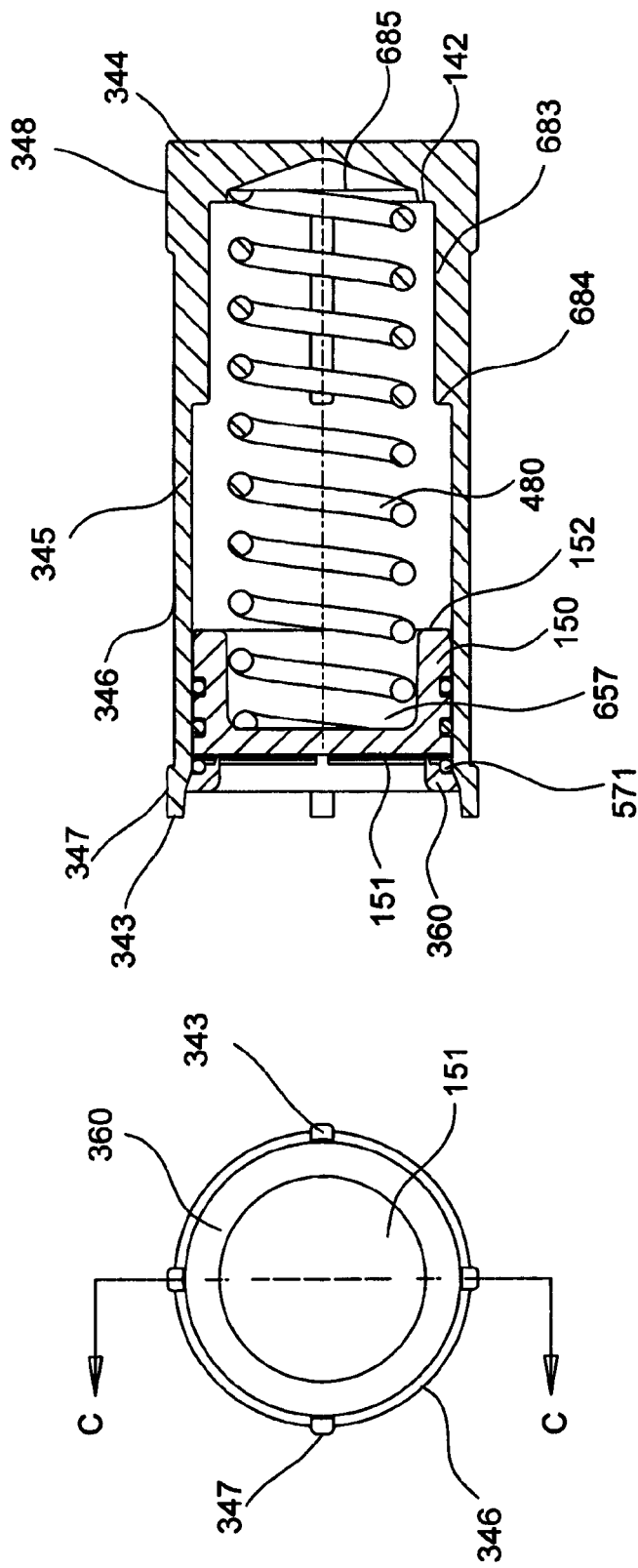

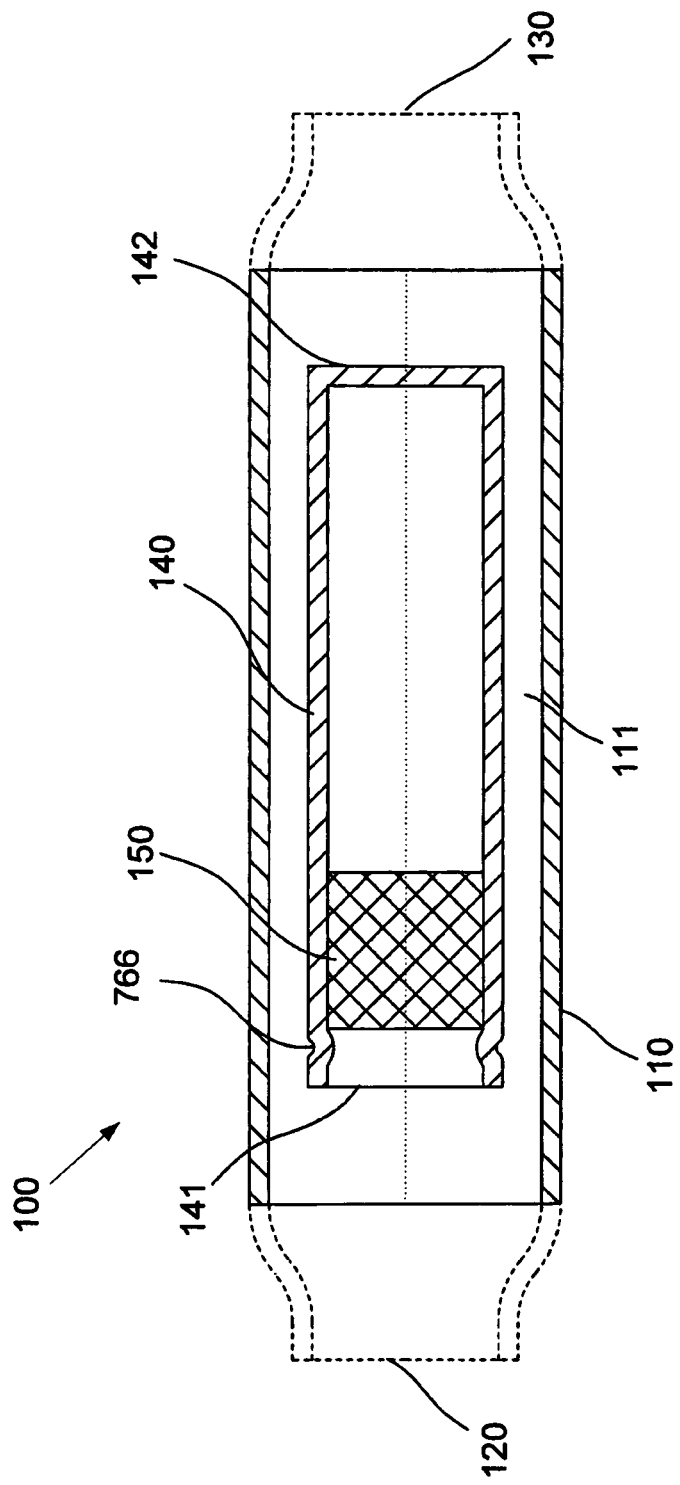

WATER HAMMER ARRESTER

This application claims benefit from International Application No. PCT/AU2012/000044, which was filed on Jan. 20, 2012, which in turn claims priority to Australian Patent Application No. AU 2011900191, which was filed on Jan. 21, 2011, wherein the entireties of said patent applications are incorporated herein by reference.

BACKGROUND OF THE INVENTION

The present invention relates to a water hammer arrester for installation into a water pipeline, and particularly to a water hammer arrester including a piston assembly that is adapted to absorb pressure variations in the water pipeline to thereby at least partially reduce water hammer in the water pipeline in use.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

Water hammer, also known as hydraulic shock, is a phenomenon that occurs in pressurised systems conveying fluid when the fluid flow is forced to stop suddenly. The sudden momentum change results in a pressure surge creating hydraulic shock waves. The shock waves produce an unpleasant noise and over time cause fatigue and damage to piping, joints and devices attached to the pressurised system.

Typically water hammer occurs when a positive valve is closed rapidly. Common household examples are fast closing solenoid valves on washing machines or dishwashers and flick mixer taps which allow rapid closing.

Water hammer arresters are devices installed to reduce damage to piping, fittings and attached equipment from water hammer caused by rapid closure of valves or devices.

A variety of water hammer arresters are known, although conventional piston type water hammer arresters generally consist of a housing or chamber in which a piston acts against a medium within the chamber in order to reduce the hydraulic shock. In common examples the medium is a compressed gas.

Typical conventional water hammer arresters have a single orifice for allowing water to enter and exit the piston chamber and are installed perpendicularly to the piping so as not to interrupt flow. This can look unsightly and in some cases where the installation is at the end of a rising pipe, it can cause an area of substantially reduced water flow or stagnant water which can result in bacterial or fungal growth. Examples of conventional water hammer arresters of this type are disclosed in U.S. Pat. No. 5,385,172, U.S. Pat. No. 6,095,195 and U.S. Pat. No. 6,154,961.

JP-05263985 discloses a water hammer preventer installable into a water pipeline in an in-line arrangement. The water hammer preventer is connected between two pipelines and water flowing out of the pipeline at the upstream side is made to pass through the inside of an inner cylinder of the water hammer preventer and to flow into a faucet from the pipeline at the downstream side. If the faucet is suddenly closed and thereby flow velocity is stopped, a shock wave is returned to the inside of the water hammer preventer, and the resulting pressure is made to act in a pressure receiving chamber from two inflow ports of the inner cylinder. A piston is made to go up into a piston chamber against a spring by the pressure, so as to absorb the pressure, thus the occurrence of a water hammer noise is weakened.

The piston in the above mentioned in-line design must seal on both the inner and outer cylinders forming the piston chamber of the water hammer preventer. The outer cylinder defines the exterior of the water hammer preventer and is thus susceptible to damage during transport which would affect performance and may render the unit faulty. This sealing arrangement also results in a more complicated assembly design.

Conventional water hammer arresters and the above described in-line water hammer preventer are generally constructed from copper tubing and/or brass and involve complicated and expensive manufacturing methods. The outer housings must also be welded or sweated onto a metal/brass connector. The outer housings of conventional piston chambers are generally constructed from thin walled copper which can be dented easily during transport and handling causing faulty operation. The metal construction can also result in an audible pinging sound during operation.

SUMMARY OF THE PRESENT INVENTION

In a first broad form the present invention seeks to provide a water hammer arrester for installation into a water pipeline, the water hammer arrester including:
 a) an inlet for receiving water from the water pipeline;
 b) an outlet for returning the water to the water pipeline;
 c) a body connecting the inlet and the outlet; and,
 d) a piston assembly positioned in the body to allow water to flow from the inlet to the outlet between the piston assembly and the body, wherein the piston assembly is adapted to absorb pressure variations in the water pipeline to thereby at least partially reduce water hammer in the water pipeline in use.

Typically the body and the piston assembly are configured to allow water to flow substantially around the piston assembly.

Typically at least a portion of the body is in the shape of an elongate hollow cylinder, and typically the inlet and the outlet are positioned at opposite ends of the body.

Typically the body is formed from a section of a pipe.

Typically the piston assembly includes an elongate housing dimensioned to fit within an inner wall of the body.

Typically at least a portion of the housing has a substantially cylindrical outer surface, and typically the outer surface of the housing has a diameter that is less than a diameter of the inner wall of the body.

Typically the body and the piston assembly define respective axes, and typically the piston assembly is positioned coaxially inside the body to thereby define an annular water passageway between at least part of the inner wall of the body and at least part of the outer surface of the housing of the piston assembly.

Typically a cross sectional area of the water passageway is equal to or greater than a cross sectional area of the water pipeline.

Typically the housing of the piston assembly includes a plurality of lugs for positioning the piston assembly in the body.

Typically at least some of the plurality of lugs are positioned at one end of the housing and at least some of the plurality of lugs are positioned at another end of the housing.

Typically the plurality of lugs protrude outwardly from the outer surface of the housing to thereby maintain a separation between the outer surface and the inner wall of the body.

Typically the plurality of lugs are arranged circumferentially about the housing, and typically each of the plurality of lugs protrude outwardly from the outer surface by substantially the same distance to thereby substantially radially centralise the piston assembly inside the body.

Typically the inner wall of the body includes at least one circumferential step for longitudinally restraining the piston assembly in the body.

Typically the inner wall of the body includes a plurality of inwardly protruding dimples for positioning the piston assembly in the body.

Typically the dimples are for at least one of radially centralising the piston assembly inside the body and longitudinally restraining the piston assembly in the body.

Typically the piston assembly includes a piston positioned in the housing, and typically the housing includes an open end and a closed end.

Typically the piston is slidably moveable along at least part of a length of the housing, and typically a first end of the piston is exposed to the water at the open end of the housing such that movement of the piston is based at least in part on a pressure of the water.

Typically a second end of the piston defines a chamber at the closed end of the housing, such that a volume of the chamber varies with movement of the piston.

Typically the piston is biased towards the open end of the housing by a medium in the chamber.

Typically the medium includes at least one of the following:
a) a pressurised gas;
b) pressurised air;
c) a spring; and,
d) a resilient member.

Typically the piston includes at least one of the following:
a) at least one seal for substantially preventing water from leaking into the chamber;
b) at least one circumferential groove for retaining at least one seal;
c) a circumferential wiper edge at the first end of the piston for substantially preventing contaminants from entering the chamber along an inner surface of the housing; and,
d) a recess at the second end of the piston for interfacing with a spring in the chamber.

Typically the piston assembly includes a spring positioned inside the chamber between the piston and the closed end of the housing.

Typically the housing of the piston assembly includes a stop for preventing over compression of the spring when the piston is moved towards the closed end.

Typically the stop includes at least one of:
a) a protrusion extending axially from the closed end of the housing into the chamber; and,
b) one or more protrusions extending inwardly from the inner wall of the housing into the chamber.

Typically the piston assembly includes a retaining ring positioned at the open end of the housing, the retaining ring being for retaining the piston in the housing.

Typically the retaining ring and piston are molded as a single part, and typically the retaining ring is connected to the piston by frangible tabs configured to allow the retaining ring and piston to separate from one another upon initial use of the water hammer arrester.

Typically the piston assembly includes an O-ring positioned between the retaining ring and the piston.

Typically the housing includes an integral inwardly projecting retaining feature positioned at the open end of the housing for retaining the piston in the housing.

In a second broad form the present invention seeks to provide a water hammer arrester for installation into a water pipeline, the water hammer arrester including a piston assembly for positioning in the water pipeline to allow water to flow through the water pipeline between the piston assembly and the water pipeline, wherein the piston assembly is adapted to absorb pressure variations in the water pipeline to thereby at least partially reduce water hammer in the water pipeline in use.

BRIEF DESCRIPTION OF THE DRAWINGS

An example of the present invention will now be described with reference to the accompanying drawings, in which:—

FIG. 3F is a schematic cutaway perspective view of the piston assembly of FIG. 3D;

FIG. 3G is a schematic cutaway perspective view of the piston assembly of FIG. 3D;

FIG. 3H is a schematic front view of a housing of the piston assembly of FIG. 3D;

FIG. 3I is a schematic rear view of the housing of FIG. 3H;

FIG. 3J is a cross-sectional side view of the housing of FIG. 3H;

FIG. 4F is a schematic front view of a housing of the piston assembly of FIG. 4D;

FIG. 4G is a schematic rear view of the housing of FIG. 4F;

FIG. 4H is a cross-sectional side view of the housing of FIG. 4F;

FIG. 5C is a schematic perspective view of a piston of the piston assembly of FIG. 5A;

FIG. 5D is a schematic perspective view of the piston of FIG. 5A;

FIG. 5E is a schematic front view of the piston of FIG. 5A;

FIG. 5F is a cross-sectional side view of the piston of FIG. 5A;

FIG. 5G is a cross-sectional side detail view of the piston of FIG. 5A;

FIG. 6B is a schematic front view of the piston assembly of FIG. 6A;

FIG. 6C is a cross-sectional side view of the piston assembly of FIG. 6A;

FIG. 7 is a schematic cross-sectional side view of a sixth example of a water hammer arrester;

DETAILED DESCRIPTION OF THE PREFERRED EMBODIMENTS

Figure 1:
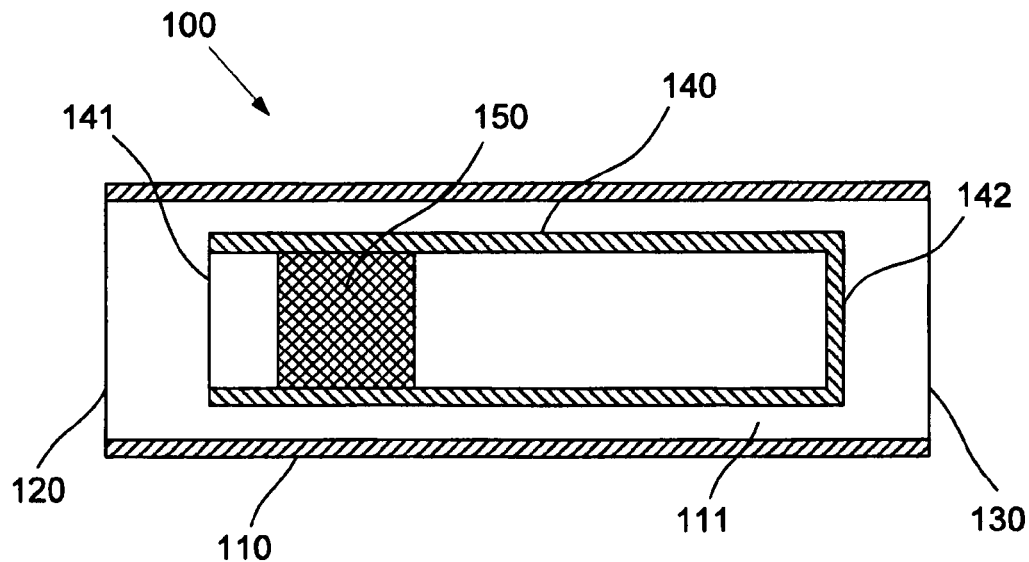
FIG. 1 is a schematic cross-sectional side view of an example of a water hammer arrester.

A first example of a water hammer arrester will now be described with reference to FIG. 1.

The water hammer arrester 100 is configured for installation in a water pipeline and includes an inlet 120 for receiving water from the water pipeline and an outlet 130 for returning the water to the water pipeline.

The water hammer arrester 100 also includes a body 110 which connects the inlet 120 and the outlet 130. Accordingly, the water hammer arrester 100 can be installed into the water pipeline by connecting the inlet 120 to an end of a first pipe in the water pipeline and connecting the outlet 130 to an end of a second pipe in the water pipeline, such that water is allowed to flow through the body 110 of the water hammer arrester 100 between the inlet 120 and the outlet 130.

It will be appreciated that the direction of water flow through the body 110 may vary depending on the particular installation of the water hammer arrester 100 in the water pipeline, and therefore the use of the terms inlet 120 and outlet 130 are used for convenience only and are not intended to restrict the direction of water flow to and from the water pipeline.

A piston assembly 140 is positioned in the body 110 in such a way that water is allowed to flow from the inlet 120 to the outlet 130 between the piston assembly 140 and the body 110. Accordingly, the flow of water through the body 110 in use is not significantly obstructed by the presence of the piston assembly 140 in the body 110.

The piston assembly 140 is adapted to absorb pressure variations in the water pipeline to thereby at least partially reduce water hammer in the water pipeline in use. In general, this is achieved by using piston 150 that moves within the piston assembly 140 to absorb at least some of the pressure variations in the water flow. This helps to mitigate hydraulic shock and avoid problems associated with vibration, which in turn leads to noisy and banging pipes.

In this example, the piston assembly 140 includes an open end 141 and a closed end 142. The piston 150 is exposed to water flowing through the water pipeline via the open end 141, and a resilient medium, such as a compressible gas or a spring, is provided inside the piston assembly 140, between the piston 150 and the closed end 142. In use, the resilient medium at least partially opposes movement of the piston 150 towards the closed end 142, so that movement of the piston 150 within the piston assembly 140 is thereby at least partially based on a combined effect of the pressure of the water at the open end 141 and a reaction provided by the resilient medium within the piston assembly 140. As a result, the resilient medium applies a restoring force to the piston 150 so that the piston is urged towards the open end 141 under normal water pressure and flow conditions, such as when a valve in the water pipeline is open and water is allowed to flow without substantial pressure variations. Illustrative examples of particular piston assembly 140 configurations, including examples of the types of resilient media that may be provided in the piston assembly 140, will be discussed in more detail below.

In one example, at least a portion of the body 110 is in the shape of an elongate hollow cylinder, and the inlet 120 and the outlet 130 are positioned at opposite ends of the body 110. Accordingly, the body 110 may be a section of pipe, and the inlet 120 and the outlet 130 can be ends of the section of pipe which may be connected to respective ends of the first and second pipes of the water pipeline using suitable pipe fittings. It will be appreciated that a standard pipe geometry may be used in this example.

In another example, the body 110 is a customised component that is configured to retain the piston assembly 140 between the inlet 120 and outlet 130, and thus may be provided together with the piston assembly 140 for installation into the water pipeline as a complete assembly. In this case, the body 110 may be mass produced using molded plastic, or any other suitable material, in order to provide integral molded features for retention of the piston assembly 140 and/or integral installation features such as threads in the inlet 120 and outlet 130.

It will be appreciated that the body 110 can also be formed from metal, whereby numerous manufacturing methods will be available including machining, casting or forming from metal tubing or sheet metal. Other suitable materials include ceramics, which may be cast into desired geometries.

In view of the above, it will be appreciated that the water hammer arrester 100 can either be provided as a single unit including the body 110 and the piston assembly 140, or otherwise the piston assembly 140 can be provided as an insert so that a functional water hammer arrester 100 can be constructed by inserting the piston assembly 140 into any suitable body 110, such as a section of pipe. Accordingly, the piston assembly 140 may be shaped to aid insertion of the piston assembly 140 into the body 110.

In any event, a water hammer arrester 100 configuration in which the inlet 120 and the outlet 130 are positioned at opposite ends of the body 110 allows the water hammer arrester 100 to be installed in the water pipeline in an in-line arrangement, in which the bulk flow of the water through the water hammer arrester 100 is able to pass through the water hammer arrester 100 without undergoing a resultant change in direction between the inlet 120 and the outlet 130.

It will be appreciated that such an in-line installation arrangement allows the water hammer arrester 100 to be provided in the water pipeline with reduced space requirements, compared to conventional water hammer arresters, which typically include a piston chamber that protrudes perpendicularly from the water pipeline. It will be understood that conventional water hammer arresters of the protruding piston chamber type require a substantial amount of otherwise unoccupied space around the water pipeline in order to accommodate the protruding piston chamber, which will not be required when installing the water hammer arrester 100 in the in-line arrangement described above.

A further benefit of the in-line arrangement compared to conventional protruding piston chamber water hammer arresters is that the direction of movement of the piston 150 can be aligned with the direction of water flow through the water hammer arrester 100, to thereby allow the piston 150 to be more directly exposed to the kinetic energy of the flowing body of water, along with any pressure waves propagating along the water pipeline. It will be appreciated that this acts to further improve the water hammer reduction performance of the water arrester 100 over conventional products.

In order to further illustrate the use of the water hammer arrester 100, a non-limiting example of an installation of a water hammer arrester 100 into a water pipeline will now be described with reference to FIG. 2.

In this example, the water hammer arrester 100 is installed in the water pipeline between two separate pipe sections 210, 220. Water is supplied to a flick mixer tap 200, through the pipe sections 210, 220, and the water hammer arrester 100 which is connected between the pipe sections 210, 220 by the inlet 120 and outlet 130. The flow of water through the tap 200 is controlled by the operation of a tap handle 201 in the usual manner.

In the event that the tap handle 201 is used to rapidly close the tap 100 and thereby suddenly stop the flow of water through the tap 200, a pressure wave may be induced by the rapid momentum change in the water, which propagates through the water pipeline from the closed tap 200. As the pressure wave propagates through the water hammer arrester 100, the piston assembly 140 positioned in the water flow path absorbs at least some of the pressure variations caused by the pressure wave and/or kinetic energy of the moving water front. It will be appreciated that absorption of pressure variations will help to reduce the effects of water hammer throughout the water pipeline, particularly in the vicinity of the water hammer arrester 100, thereby reducing the likelihood of associated damage, pipe vibration and hence noise.

Figure 2:
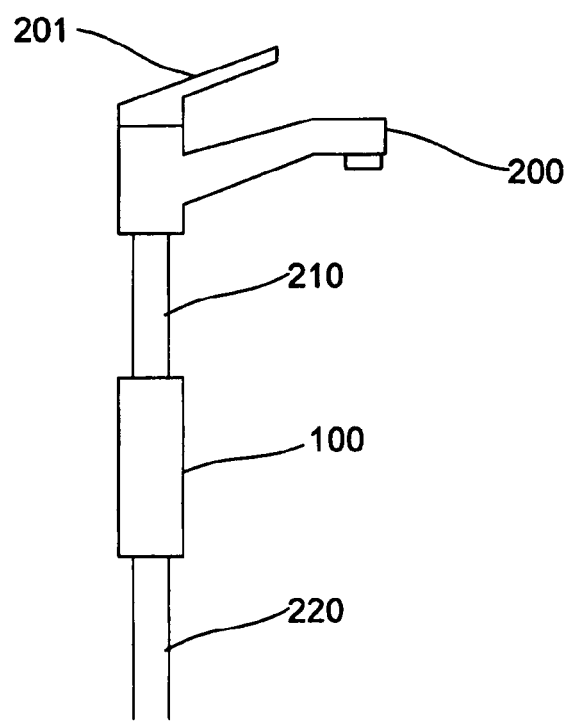
FIG. 2 is a schematic diagram of an example of a water hammer arrester installed into a water pipeline.

It should be noted that FIG. 2 merely illustrates one possible example of use of the water hammer arrester 100, and it will be appreciated that the water hammer arrester 100 may be used in a wide range of situations in which the effects of water hammer may be undesirable. For example, the water hammer arrester 100 may be installed anywhere in a water pipeline which may be subject to pressure variations. Common examples in which an installation of a water hammer 100 may be beneficial include water pipelines in the vicinity of rapidly closing valves, such as those found in washing machines or dishwashers.

It is often desirable to install the water hammer arrester 100 in a position that is as close as possible to the source of pressure waves, and it will be appreciated that the reduced space requirements of the water hammer arrester 100, particularly in view of the ability to install the water hammer arrester 100 in an in-line arrangement as illustrated in FIG. 2, help to facilitate such an installation strategy. In contrast, conventional water hammer arresters usually require an elbow junction or the like and/or increased space to accommodate a protruding piston chamber in order to allow installation, and this acts to limit the locations in which conventional water hammer arresters can be conveniently installed. Given this, it will be understood that the water hammer arrester 100 allows an improvement in flexibility of installation as compared to conventional water hammer arresters.

Despite the above discussed benefits of the in-line arrangement, it should be appreciated that other embodiments of the water hammer arrester 100 may also be provided, whilst maintaining a similar principle of operation. For example, the outlet 130 may be configured to return the water to the water pipeline at a different direction to the direction the water is received at the inlet 120, such that a change in the water flow direction is effected as the water flows through the body 110. It will be appreciated that one example of such a configuration would involve a body 110 with an integral elbow arrangement at one end. In that example, the piston assembly 140 would still be positioned in the body 110 in such a way as to allow water to flow between the piston assembly 140 and the body 110, such that the water hammer arrester 100 would still offer improved water hammer reduction performance and reduced space requirements when compared to a conventional water hammer arrester of the protruding piston chamber type, irrespective of the change in water flow direction.

A second example of a water hammer arrester will now be described with reference to FIGS. 3A to 3O.

Figure 3A:
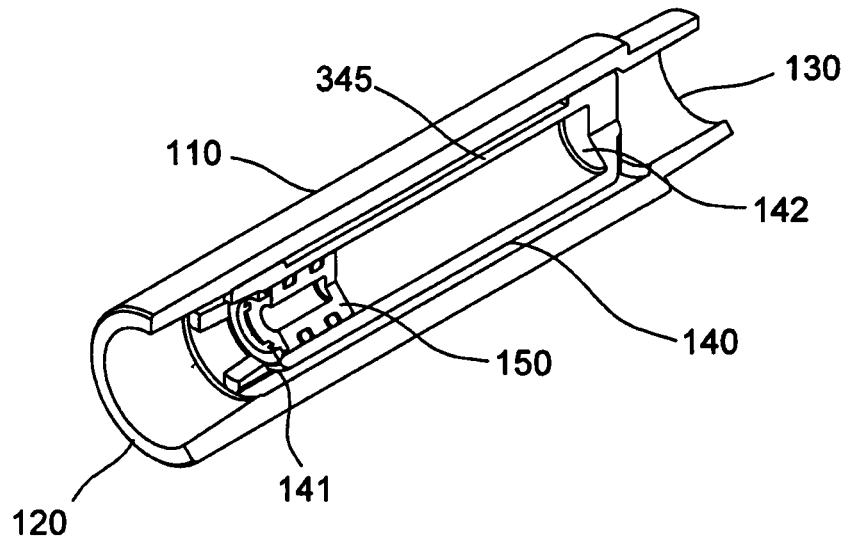
FIG. 3A is a schematic cutaway perspective view of a second example of a water hammer arrester.
Figure 3B:
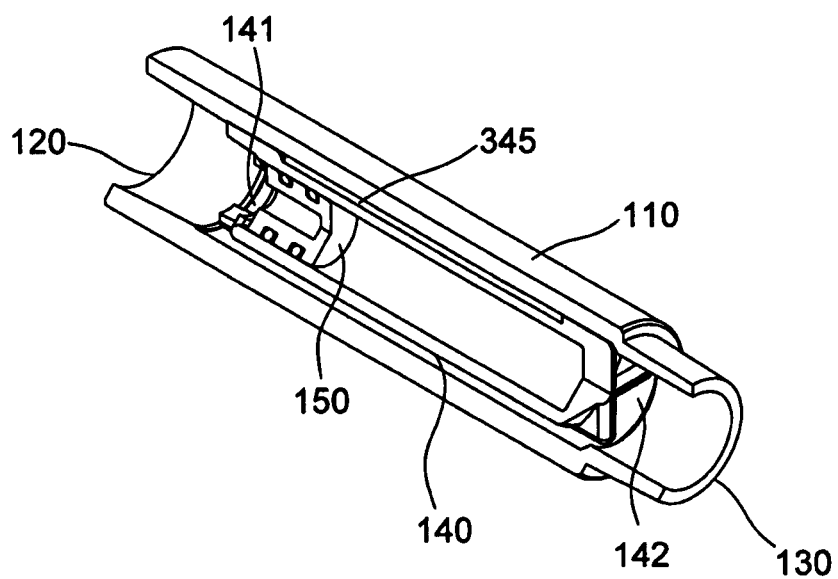
FIG. 3B is a schematic cutaway perspective view of the water hammer arrester of FIG. 3A.

The cutaway views of FIGS. 3A and 3B allow the internal configuration of the piston assembly 140 within the body 110 to be better appreciated.

In this example, it is noted that the body 110 has the inlet 120 and outlet 130 positioned at opposite ends of the body 110 to allow for an in-line installation, as described above. Both of the inlet 120 and the outlet 130 are configured for connection to first and second pipe sections of the water pipeline at each end of the piston assembly 100. In this case, the inlet 120 is adapted to have a connection fitting inserted into inlet 120 for connection to the first pipe section, whilst the outlet 130 is adapted for insertion into suitable connection fitting for connection to the second pipe section.

The piston assembly 140 includes an elongate housing 345 with an open end 141 and a closed end 142. The piston 150 is positioned in the housing 345 and is slidably moveable along at least a portion of the housing 345.

In use, water is allowed to flow through the inlet 120, around the housing 345 between the piston assembly 140 and the body 110 and to subsequently exit the body 110 via the outlet 130. A first end 351 of the piston 150 is exposed to the water at the open end 141 of the housing 345 such that the piston 150 is urged towards the closed end 142 at least in part by the pressure of the water that is passing through the water hammer arrester 100.

In this example, the resilient medium provided inside the piston assembly 140 between the piston 150 and the closed end 142 is a pressurised gas. The pressurised gas may be pressurised air or any other gas which may be retained at pressure in the piston assembly 140. The pressure of the pressurised gas provides a restoring force that urges the piston 150 towards the open end 141 and the pressure is typically selected to be equal to or greater than the normal water pressure when water is allowed to flow freely though the water pipeline. In the event of an increase in water pressure, as may be caused by a rapidly closing valve for example, the piston 150 moves against the restoring force provided by the gas pressure.

Preferably, the gas provided as the medium inside the piston assembly 140 will be selected to minimise the risk of leakage of the gas past the piston 150, to thereby reduce loss of pressure in the gas throughout the life of the water hammer arrester 100.

In this example, the piston assembly 140 is configured to allow it to be inserted into the body 110 and retained within the body 110 for use. An example external configuration of the piston assembly may be better appreciated by reference to FIGS. 3C and 3D.

At least a portion of the piston assembly 140 has a substantially circumferential outer surface. This outer surface of the housing 345 has a diameter that is less then a diameter of an inner wall of the body 110. The difference between the respective outer and inner diameters of the housing 345 and the body 110 provides a water passageway between the body 110 and the piston assembly 140, allowing the passage of water therebetween.

In this example, the piston assembly 140 is adapted to be positioned coaxially inside the body 110 to thereby define an annual water passageway around the outer surface of the housing 345. In one particular example, the body 110 and piston assembly 140 are dimensioned to define an annular water passageway with a cross sectional area that is equal to or greater than a cross sectional area of the water pipeline in the pipe sections from/to which the water flows. It will be appreciated that this allows water to flow from the water pipeline and through the water hammer arrester 100 without the water hammer arrester 100 substantially restricting to the cross sectional area through which water is allowed to flow. Accordingly, the water hammer arrester 100 configured in the fashion described above will not substantially obstruct the flow of water through the water pipeline.

It will be appreciated that in order to provide a water passageway around the piston assembly 140 which does not substantially obstruct the flow of water, the diameter of inner surface of the body 110 should be greater than the inner diameter of the pipes sections of the water pipeline. Whilst this will result in a marginal increase in space requirements at the point of installation of the water hammer arrester 100, as can be seen for example in FIG. 2, it will be noted that the resulting installation is nevertheless more compact than a conventional water hammer arrester of the protruding piston chamber type may allow.

The housing 345 of the piston assembly 140 includes a plurality of lugs 343, 344 for positioning the piston assembly 140 in the body 110. In this example, at least some of the lugs 343 are positioned at the open end 141 of the piston assembly 140, and at least some of the lugs 344 are positioned at the opposite, closed end 142 of the piston assembly 140.

Figure 3C:
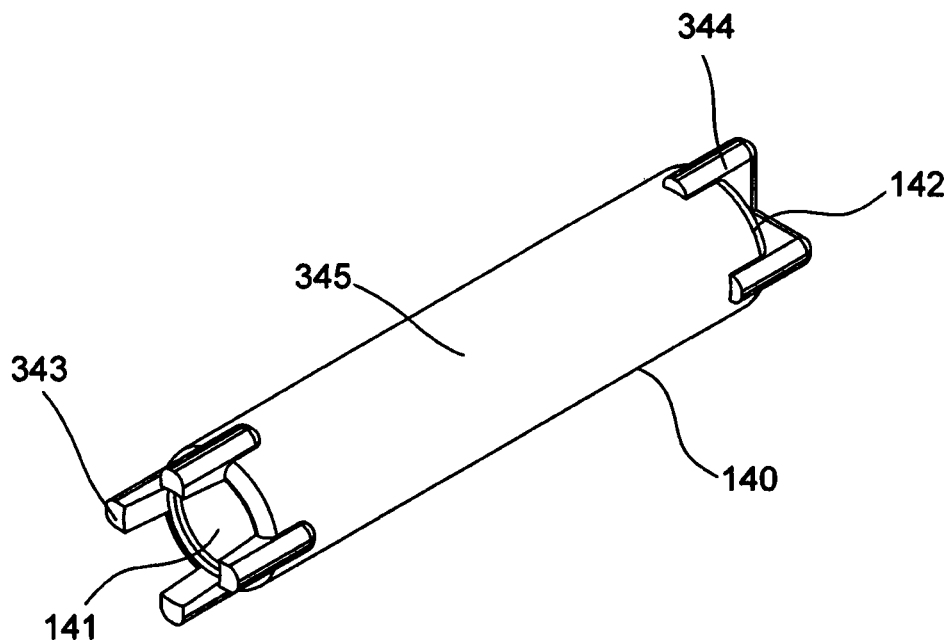
FIG. 3C is a schematic perspective view of a piston assembly of the water hammer arrester of FIG. 3A.
Figure 3D:
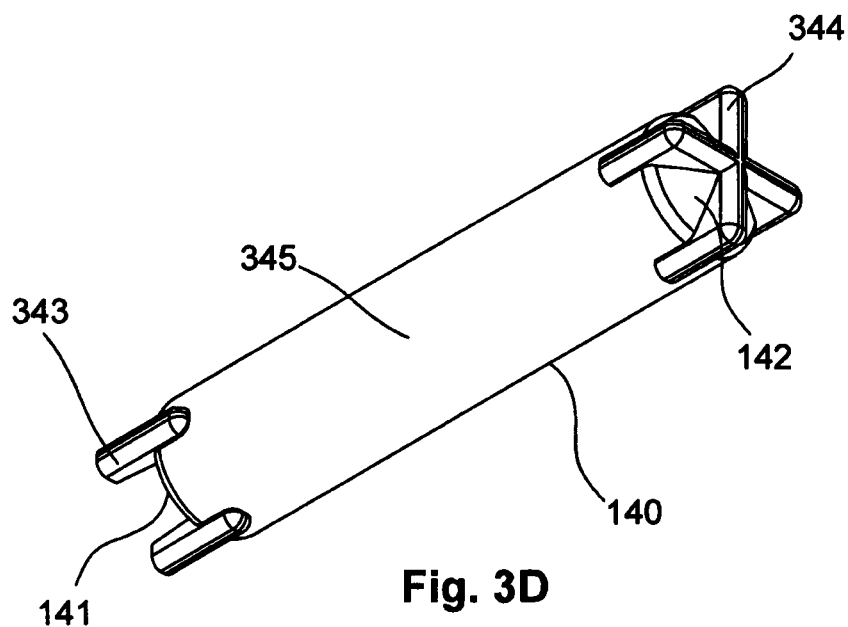
FIG. 3D is a schematic perspective view of the piston assembly of FIG. 3C.

As can be seen in FIGS. 3C and 3D, the lugs 343 at the open end 141 have a different configuration to the lugs 344 at the closed end 142. In particular, the closed end lugs 344 are connected across the closed end 142, whilst the open end lugs 343 protrude from the open end 141 in an open arrangement, in order to not obstruct the opening at the open end 141 of the piston assembly 140.

In any event, each of the plurality of lugs protrudes outwardly from the outer surface of the housing 345 to thereby maintain a separation between the outer surface of the housing 345 and the inner wall of the body 110 when the piston assembly 140 is positioned inside the body 110.

In the present example, the lugs 343, 344 are integral with the housing 345 and thus may be formed as part of the manufacture of the housing 345, such as using a plastic moulding process. However, it will be appreciated that the lugs 343, 344 may alternatively be provided in separate components which may be fitted to the housing 345 during assembly of the water hammer arrester 100. For instance, the lugs 343, 344 may be provided in the form of end cap components adapted to be installed at the respective ends 141, 142 of the piston assembly 140. These end caps may be permanently fastened to the housing 345 using adhesive or any other suitable fastening means, or held in place using an interference fit or close engagement with other features of the water hammer arrester 100 upon assembly.

In one example, the plurality of lugs are arranged circumferentially around the housing 345 and each of the lugs 343, 344 protrudes outwardly from the outer surface of the housing 345 by substantially the same distance, in order to substantially centralise the piston assembly 140 within the body 110. The number and sizing of the lugs 343, 344 in this circumferential arrangement are selected to provide adequate radial support of the piston assembly 140 whilst minimising the obstruction presented to the flow of water by the lugs 343, 344. It will be appreciated that in this case the assembly is therefore positioned substantially coaxially inside the body 110 to thereby define an annular water passageway between at least part of the inner wall of the body 110 and at least part of the outer surface of the housing 345.

As mentioned above, the cross sectional area of the annular water passageway is based on the respective diameters of the outer surface of the housing 345 and the inner wall of the body 110, and therefore it will be appreciated that the offset of the lugs 343, 344 from the outer surface of the housing 345 will be based on the differences in those diameters in order to allow the correct positioning of the piston assembly 140 within the body 110.

Figure 3E:
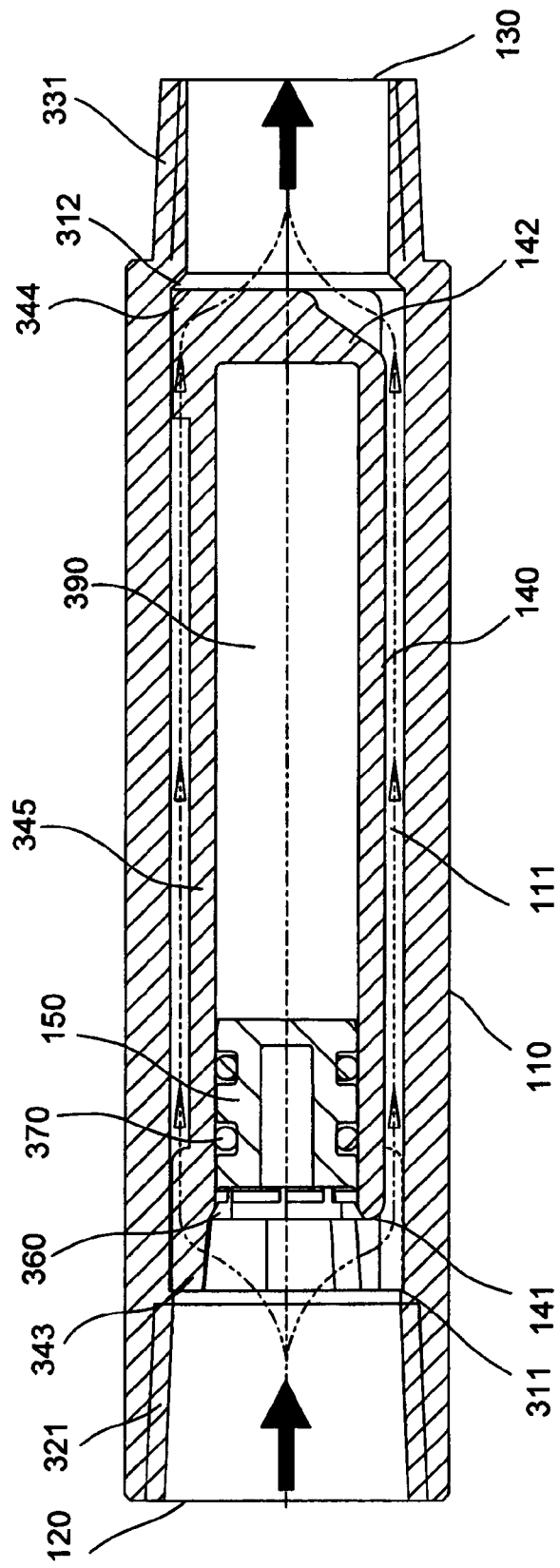
FIG. 3E is a schematic cross-sectional side view of the water hammer arrester of FIG. 3A.
Figure 3K:
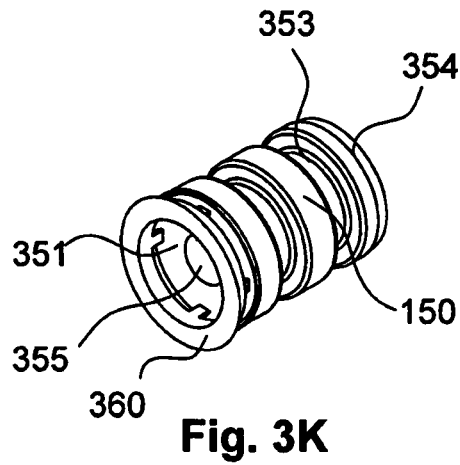
FIG. 3K is a schematic perspective view of a piston of the piston assembly of FIG. 3D.
Figure 3L:
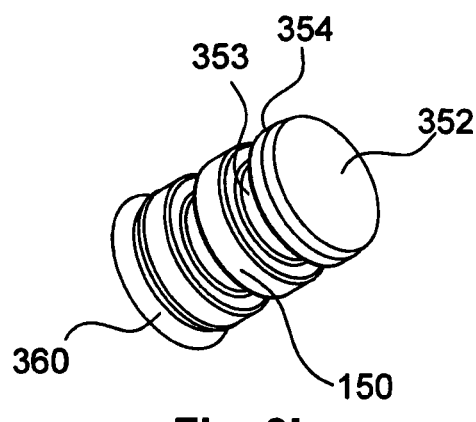
FIG. 3L is a schematic perspective view of the piston of FIG. 3K.
Figure 3M:
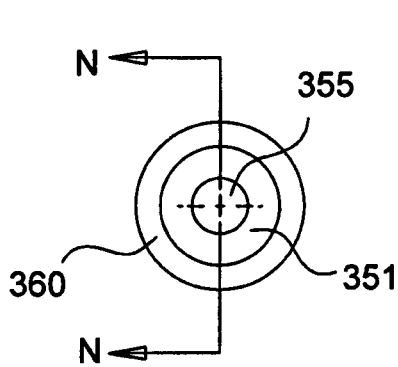
FIG. 3M is a schematic front view of the piston of FIG. 3K.
Figure 3N:
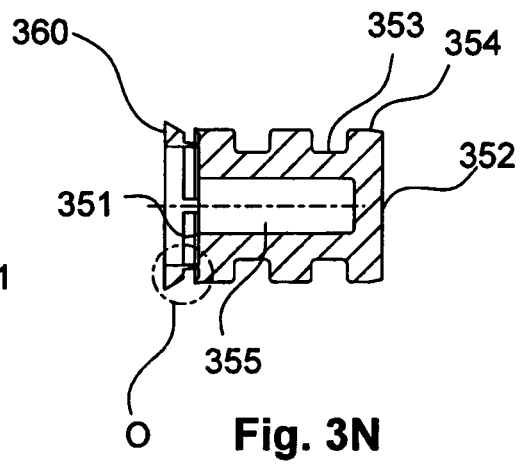
FIG. 3N is a cross-sectional side view of the piston of FIG. 3K.
Figure 3O:
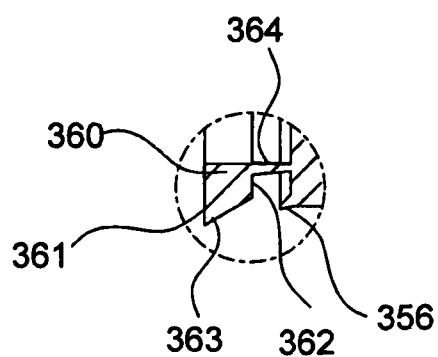
FIG. 3O is a cross-sectional side detail view of the piston of FIG. 3K.

A cross section schematic of the example of the water hammer arrester 100 of FIGS. 3A and 3B is illustrated in FIG. 3E.

In this example, the inlet 120 and the outlet 130 include respective threaded portions 321, 331 which provide a convenient means for securing the water hammer arrester 100 into the water pipeline at each end of the body 110. In this case, the inlet 120 is configured as a female threaded fitting, whilst the outlet 130 is configured as a male threaded fitting. However, it will be appreciated that any suitable means for connecting the water hammer assembly 100 into the water pipeline may be provided, and providing threaded portions 321, 331 on the inlet 120 and the outlet 130 is not essential.

An example of the positioning of the piston assembly 140 inside the body 110 will now be described in detail, with reference again to FIG. 3E. In this example, the body 110 includes one or more steps 311, 312 circumferentially about the inner wall of the body 110, the steps 311, 312 being for axially restraining the piston assembly 140 in the body 110. The steps 311, 312 are configured such that ends of the lugs 343, 344, which extend longitudinally from the housing 345, abut the steps 311, 312 to thereby reduce or prevent axial movement of the piston assembly 140 inside the body 110. However, it will be appreciated that any other means for axially restraining the piston assembly 140 may be provided.

For example, the lugs 343, 344 may be configured to protrude from the outer surface of the housing 345 by a distance that is greater than the gap defined between the outer surface of the housing 345 and the inner wall of the body 110. It will be appreciated that insertion of the piston assembly 140 into the body 110 would therefore require an interference fit. In this case, friction due to the interference between the lugs 343 and 344 and the body 110 provides a degree of restraint of the piston assembly 140 relative to the body 110. In an alternative example, the lugs 343, 344 may be bonded to the inner wall of the body 110 to similarly restrain the piston assembly 140. It will be appreciated that interference fit or bonding will also provide restraint in the radial direction, such that rotation of the piston assembly 140 inside the body 110 is reduced or prevented. Any combination of one or more means of restraining the piston assembly 140 may be provided.

In another example, the lugs 343, 344 are formed from a material that is selected to facilitate the insertion of the piston assembly 140 into the body 110. For example, the lugs 343, 344 may be formed from a resilient material, such as rubber, so that the lugs 343, 344 are allowed to deform during insertion of the piston assembly 140 into the body 110. Lugs 343, 344 formed in this manner can allow the piston assembly 140 to be easily inserted into a body 110 fitted with circumferential steps 311, 312 at each end of the body 110 as described above.

Once the piston assembly 140 is inserted into the body 110, the deformed resilient material of the lugs 343, 344 may also provide a restraining force in a similar manner to the interference fit means of restraint described above. Accordingly, it will be appreciated that rubber lugs 343, 344 may allow convenient insertion of the piston assembly 140 into a section of pipe without requiring any restraining features to be provided in the pipe for it to serve as the body 110 of the water hammer arrester 100.

It will be appreciated that the above example methods of restraint may allow the piston assembly 140 with lugs 343, 344 as described above to be positioned within a body 110 that is provided by a section of pipe without any internal restraint features, such as circumferential steps or the like. Accordingly, a length of standard pipe may be converted into a water hammer arrester 100 by inserting and retaining a piston assembly 140 within the pipe, without requiring a customised component to serve as the body 110.

The path of the water flow between the piston assembly 140 and the body 110 can be seen as indicated by the broken line and arrows along the length of the water hammer arrester 100 as shown in FIG. 3E. It will also be appreciated that kinetic energy from the flowing body of water and any pressure waves passing through the water hammer arrester 100 will act upon the piston 150 to move the piston 150 in a direction from the open end 141 of the piston assembly 140 towards the closed end 142.

As mentioned above, the piston assembly 140 of this example includes a compressed gas inside a chamber 390 defined by the housing 345 and the piston 150. The compressed air provides a reaction opposing the motion of the piston 150 when it is moved by an increase in water pressure in the water pipeline. The compressed gas also acts to bias the piston 150 towards the open end 141 in the absence of pressure variations in the water, such that under normal conditions the piston is at rest in a position at the open end 141.

In this example, a retaining ring 360 is also fitted to the open end 141 to retain the piston 150 inside the piston assembly 140. The retaining ring 360 prevents the compressed gas in the chamber 390 from forcing the piston 150 out of the open end 141. Seals 370, such as O-rings or the like, are also provided about the circumference of the piston 150 to substantially prevent leakage of either water into the chamber 390, or compressed gas from the chamber 390.

Features of the piston assembly 140 will now be described in further detail with reference to FIGS. 3F to 3G. A first end of the piston 351, which is exposed to the water at the open end 141 of the housing 345, abuts the retaining ring 360 when the piston 150 is biased towards the open end 141 by the pressurised gas in the chamber 390. The retaining ring 360 is positioned about an internal perimeter of the opening defined at the open end 141, and has an internal diameter that is smaller than an external diameter of the piston 150, such that the piston 150 is prevented from exiting the opening. The retaining ring 360 is fixed to the opening upon assembly of the piston assembly 140. This may be achieved by bonding the retaining ring to the housing 345, by using an adhesive, welding or any other means of attachment.

A second end 352 of the piston 150 is exposed to the pressurised gas inside the chamber 390. The chamber 390 is defined within the housing 345 with the closed end 142 and the second end 352 of the piston 150 defining the longitudinal extremities of the chamber 390, such that a volume of the chamber 390 changes as the piston 150 is moved along the length of the piston assembly 140. It will therefore be appreciated that as the piston 150 is moved from the open end 141 towards the closed end 142, for example in response to an increase in water pressure in the water pipeline, the volume of the chamber 390 reduces, which subsequently results in a corresponding increase in pressure of the pressurised gas inside the chamber 390. This results in the pressurised gas providing an opposing reaction against the movement of the piston 150 caused by the increased water pressure. As water pressure decreases, the piston 150 returns to the open end 141, and it will be understood that this behaviour will help to maintain a substantially constant pressure in the water pipeline.

In this example, where the medium is pressurised gas, the second end 352 of the piston 150 and the closed end 142 of the housing 345 each have relatively flat surfaces. This helps to allow a maximum range of movement of the piston 150 within the chamber towards the closed end 142, in the event that a variation in water pressure causes the pressurised gas to be highly compressed.

FIGS. 3H to 3J show further details of the housing 345 of the piston assembly 140. The front and rear views as shown in FIGS. 3H and 3I respectively illustrate the protrusion of the lugs 343, 344 outwardly from an outer surface 346 of the housing 345. In this example, a first array of four lugs 343 is provided at the open end 141 and a second array of four lugs 344 is provided at the closed end 142.

The protrusion of the lugs 343, 344 from the ends of the housing 345 in the longitudinal direction helps to ensure that the flow of water from the pipelines to the fluid pathway around the housing 345 undergoes a gradual transition to thereby help to reduce restrictions in the flow of water. The outer extremities of the lugs 343, 344 define an effective diameter that may be equal to or greater that then internal diameter of the inner wall of the body, depending on whether an interference fit of the piston assembly 140 inside the body 110 is required.

An internal chamfer 349 is provided at the open end 141 to create a lead-in for the piston and seals and allow convenient positioning of the retaining ring 360.

An example of a piston 150 configured for use with the example water hammer arrester 100 discussed above will now be described with reference to FIGS. 3K to 3O.

In this example, the piston 150 includes at least one groove 353 defined from an outer surface 354. Each groove 353 is adapted to retain a seal 370 around the circumference of the piston 150, as can be seen in FIGS. 3F and 3G. In this example, two grooves 353 and two corresponding seals 370 are provided, such that one seal 370 positioned towards the open end 121 of the piston assembly 140 will serve to substantially prevent water from leaking into the chamber 390, whilst another seal 370 positioned towards the closed end 131 of the piston assembly 140 is for substantially preventing pressurised gas from leaking out of the chamber 390 during movement of the piston 150.

In this example, the piston 150 is constructed with a hollow internal cavity 355 which is open at the first end 351 of the piston 150. This hollow internal cavity 355 may be provided for manufacturing reasons since it allows a reduction in the material used to make the piston and has the added benefit of reducing the weight of the piston 150. However, it will be appreciated that the hollow internal cavity 355 and a piston 150 with a solid construction can be used.

Although the piston 150 may be manufactured from any suitable material including metal or ceramic materials, one particular embodiment includes a piston 150 manufactured from a plastic material, using a molding process. Construction of the piston 150 from molded plastic allows greatly reduced manufacturing costs compared to the other materials and manufacturing techniques.

Furthermore, the manufacture of the piston 150 from plastic allows the piston 150 and the retaining ring 360 to both be molded as a single part during manufacture. This is the case in the example piston 150 of FIGS. 3K to 3O, where the retaining ring 360 is connected to the piston 150 by a plurality of frangible tabs 364. The details of this connection can be seen more clearly in the detailed view of FIG. 3O. The tabs 364 are configured to allow the retaining ring 360 and the piston 150 to separate from one another upon initial use of the water hammer arrester 100, by having the tabs 364 break away from the piston 150 when the piston 150 is moved away from the retaining ring 360 by a pressure wave in the water flow, or the like.

The manufacture of the piston 150 and retaining ring 360 as a single molded part helps to simplify handling and assembly of the water hammer arrester 100. The retaining ring 360 is bonded to the housing 345 in order to secure the retaining ring 360 in place and thus prevent the piston 150 from being expelled from the piston assembly 140 due to the pressurised gas in the chamber 390.

In one example, the piston 150 also includes a wiper edge 356 around an outside edge of the first end 351 of the piston 150. The wiper edge 356 helps to prevent contaminants from entering the chamber 390 along the inner surface of the housing 345 during movement of the piston 150. Whilst the combined effect of the wiper edge 356 along with two seals 370 positioned in grooves 353 of the piston 150 as described above provides particularly effective resistance to leakage and a barrier to contaminants, it will be appreciated that any combination of seals, wiper edges, or any other means of preventing leakage or ingress of contaminants can be provided.

A third example of a water hammer arrester will now be described with reference to FIGS. 4A to 4M. It should be noted that this example embodiment includes a number of similarities to the second example described with reference to FIGS. 3A to 3O, and similar features will be referenced using similar reference numbers throughout the following description.

A primary difference in the configuration of this example of the water hammer arrester 100 lies in the type of medium provided in the piston assembly 140. In particular, in this example the piston assembly 140 includes a spring 480 positioned inside the chamber 390 between the piston 150 and the closed end 142 of the housing 345.

The spring 480 provides a similar functionality to the pressurised gas in the previous example water hammer arrester embodiment described with reference to FIGS. 3A to 3O, by providing a restoring force against movement of the piston 150 under the influence of increased water pressure in the water pipeline. Accordingly, as the piston assembly 140 moves away from the open end 141 of the piston assembly 140, the spring 480 is compressed. As a result of this compression the spring 480 applies an increased reaction force on the second end 352 of the piston 150 as it moves further away from the open end 141 of the piston assembly 140.

Figure 4A:
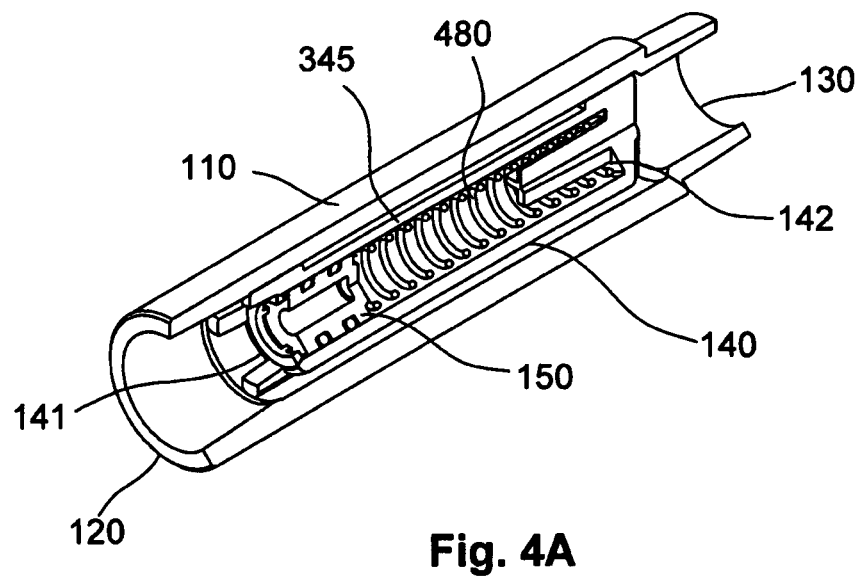
FIG. 4A is a schematic cutaway perspective view of a third example of a water hammer arrester.
Figure 4B:
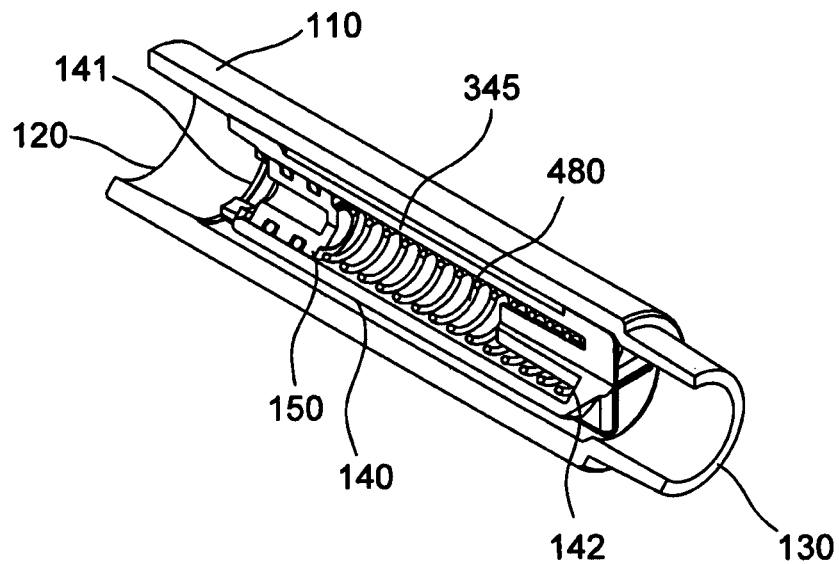
FIG. 4B is a schematic cutaway perspective view of the water hammer arrester of FIG. 4A.
Figure 4C:
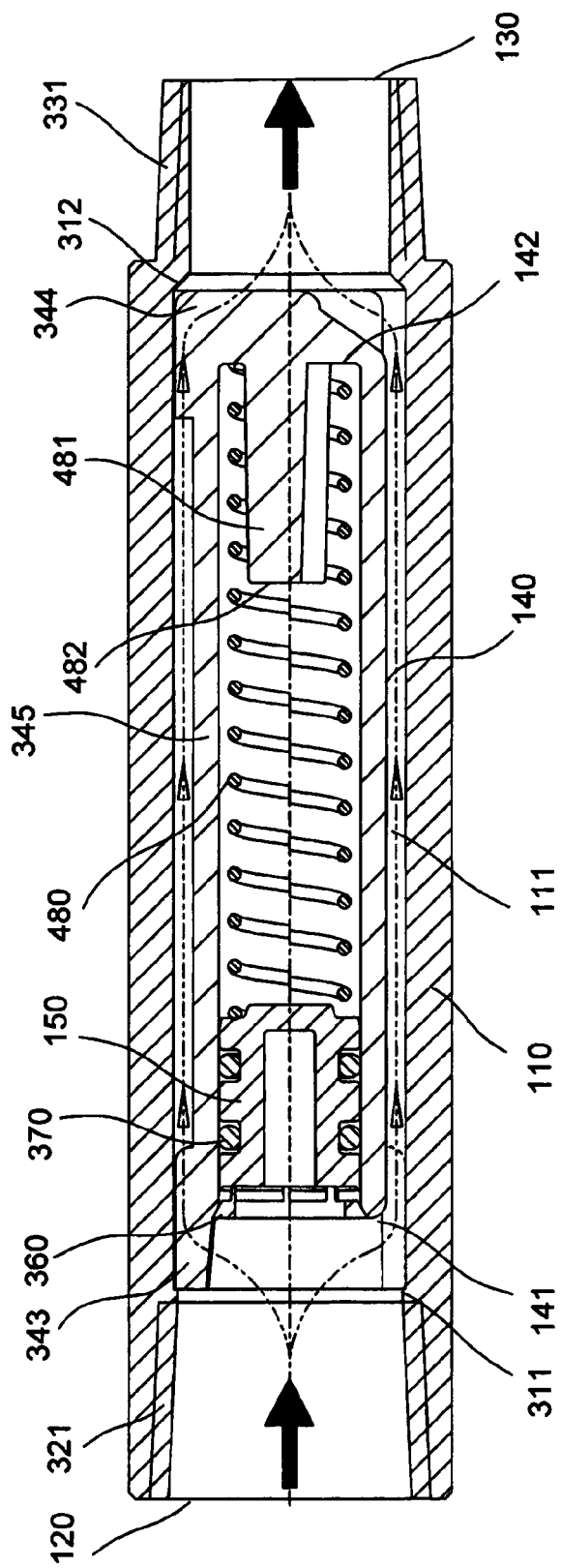
FIG. 4C is a schematic cross-sectional side view of the water hammer arrester of FIG. 4A.

FIG. 4C illustrates a cross-sectional schematic of the example of the water hammer arrester 100 of FIGS. 4A and 4B in order to more clearly show the configuration of the spring 480 within the piston assembly 140.

It will be appreciated that the external configuration of the piston assembly 140 is generally the same as that of the previously described water hammer arrester example, whereby lugs 343, 344 are provided at the ends of the housing 345 and the water is allowed to flow around the piston assembly 140 between an outer surface of the housing 345 and an inner wall of the body 110 for an annular passage way 111. However, the internal configuration of the piston assembly 140 includes particular adaptations to accommodate the spring 480 as the reaction medium inside the chamber 390. In particular, the housing 345 of the piston assembly 140 includes a stop 481 extending inside the chamber from the closed end 142.

The stop 481 helps to prevent over-compression of the spring 480 when the piston 150 is moved towards the closed end 142 of the housing 345. It will be appreciated that a length of the stop 481 should therefore be selected to be greater than a length of the spring 480 under its maximum desirable compression, such that the piston 150 comes into contact with the internal face 482 of the stop 481 before the spring 480 is compressed beyond desirable limits.

Figure 4D:
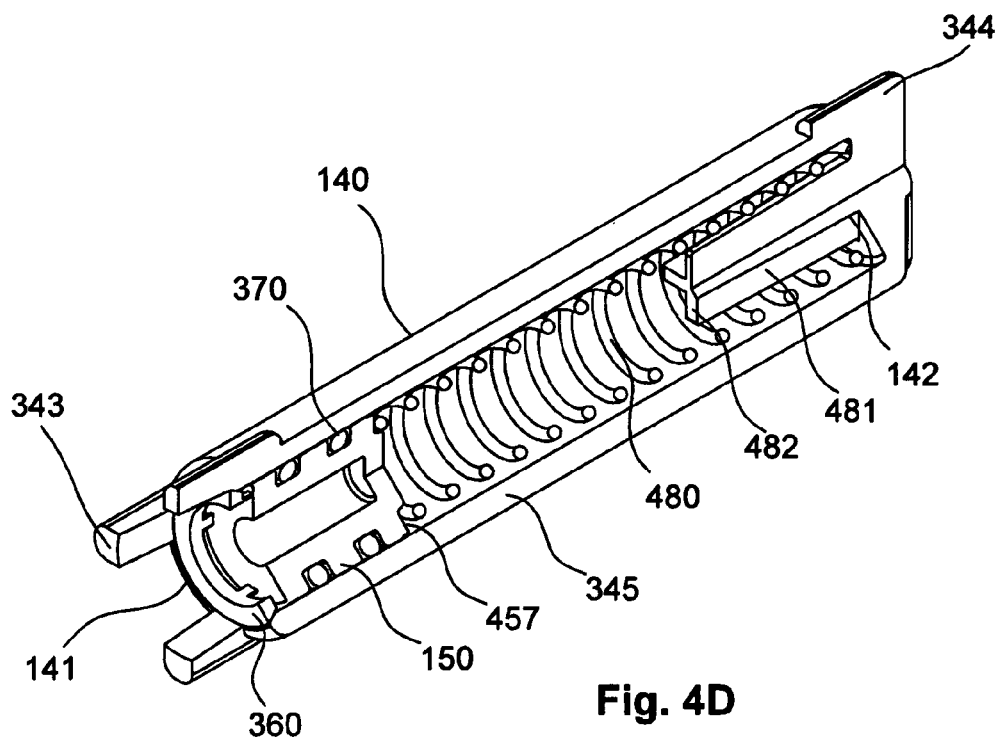
FIG. 4D is a schematic cutaway perspective view of a piston assembly of the water hammer arrester of FIG. 4A.
Figure 4E:
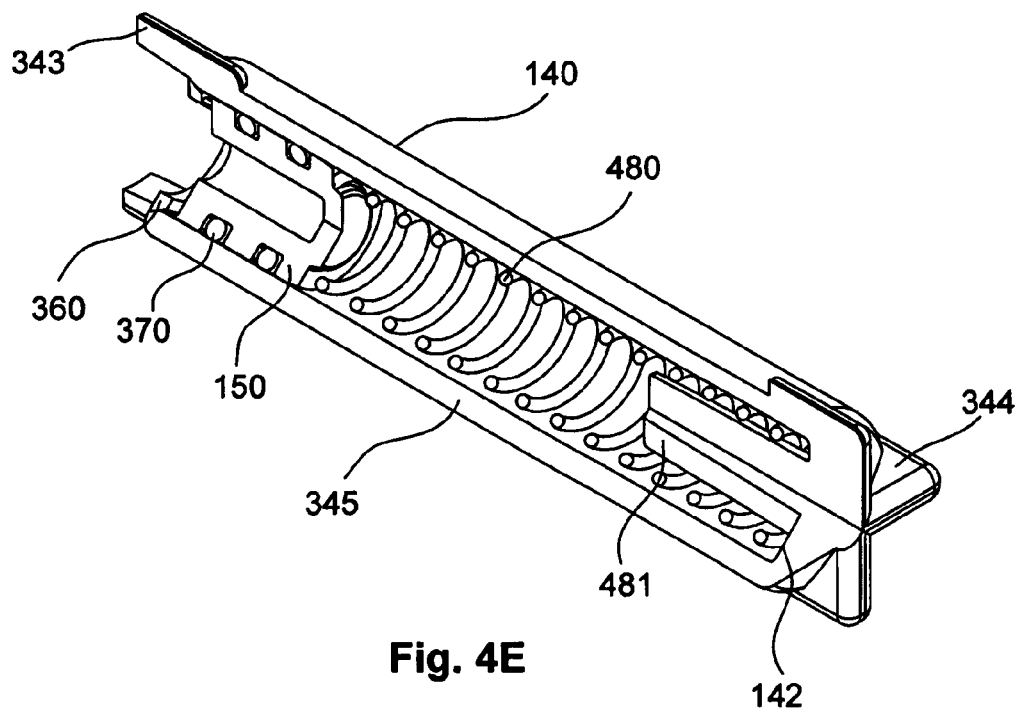
FIG. 4E is a schematic cutaway perspective view of the piston assembly of FIG. 4D.
Figure 4I:
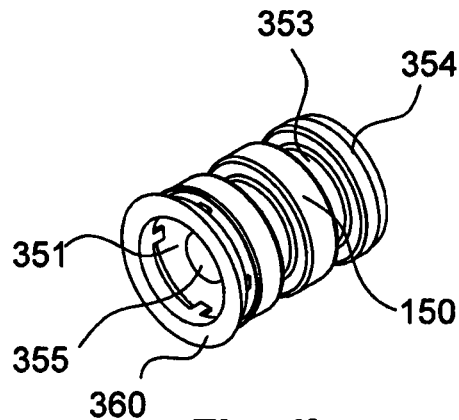
FIG. 4I is a schematic perspective view of a piston of the piston assembly of FIG. 4D.
Figure 4J:
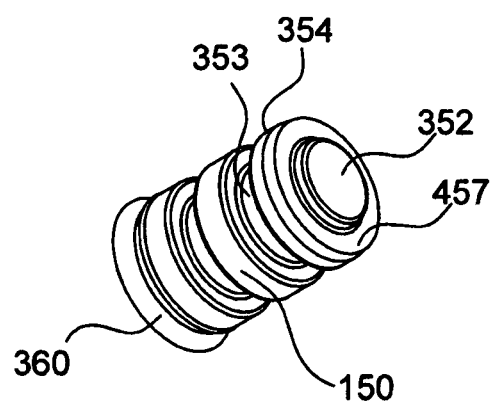
FIG. 4J is a schematic perspective view of the piston of FIG. 4I.
Figure 4K:
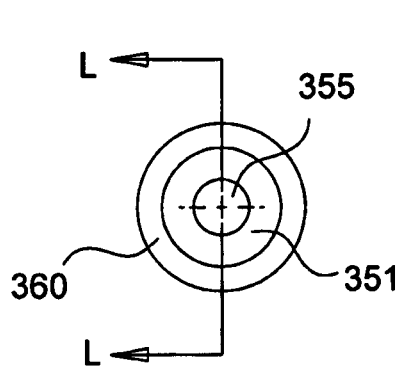
FIG. 4K is a schematic front view of the piston of FIG. 4I.
Figure 4L:
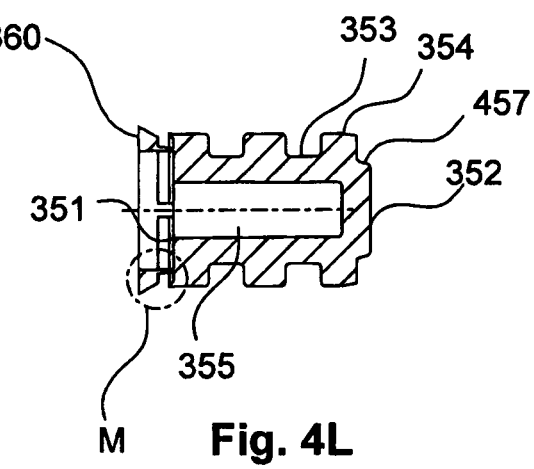
FIG. 4L is a cross-sectional side view of the piston of FIG. 4I.
Figure 4M:
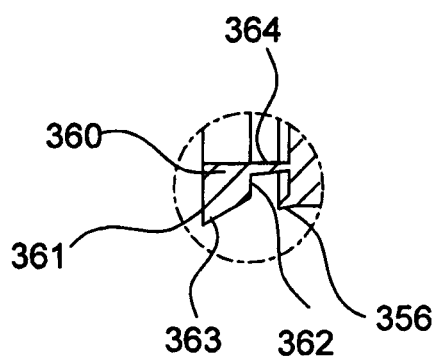
FIG. 4M is a cross-sectional side detail view of the piston of FIG. 4I.

Further internal details of the piston assembly 140 in this example can be seen with reference to FIGS. 4D and 4E. In this case, the piston stop 481 is provided in the form of an extruded cross-shaped member in order to provide the stopping functionality with efficient use of material. The stop 481 also provides an additional function of resisting spring buckling as the spring 480 compresses with movement of the piston 150. It will be appreciated that the particular shape of the stop 481 helps to reduce deformation of the spring 480 in a non-axial direction, particularly when the spring is in a highly compressed state as the piston 150 approaches the closed end 142 of the housing 345.

FIGS. 4F to 4H provide further detail of the configuration of the housing 345 including the piston stop 481, although it will be appreciated that, apart from the stop 481 the housing 345 is substantially the same as the piston housing 345 shown earlier with reference to FIGS. 3H to 3J. In any event, the cross-section of the stop 481 can be more clearly seen in FIG. 4F.

The piston 150 may also include particular adaptations for use with the spring 480, and these can be seen with reference to 4I to 4M. A primary difference in this case is that the piston 150 includes a recess 457 around an outer portion of the second end 352, wherein the recess 457 is adapted to interface with an end of the spring 480. This recess 457 helps to provide further resistance to spring buckling, by substantially preventing slippage of the spring 480 across the second end 352 of the piston 150. Otherwise, it will be appreciated that the piston 150 of this example includes generally similar features as per the example piston 150 described above with reference to FIGS. 3K to 3O.

Figure 5A:
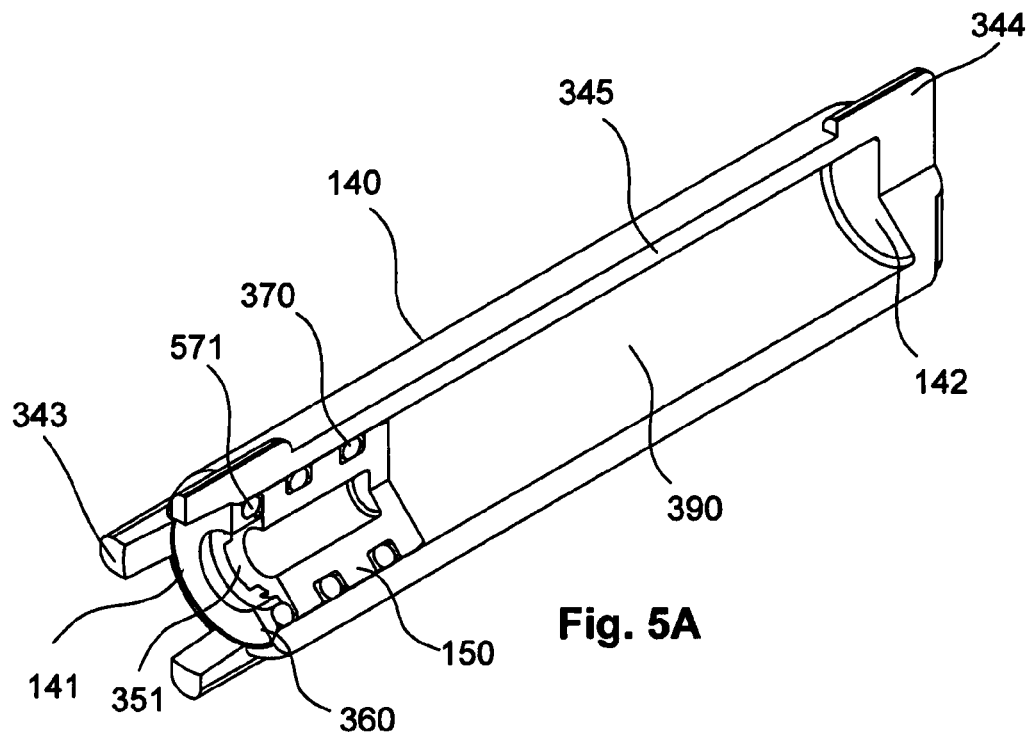
FIG. 5A is a schematic cutaway perspective view of a piston assembly of a fourth example of a water hammer arrester.
Figure 5B:
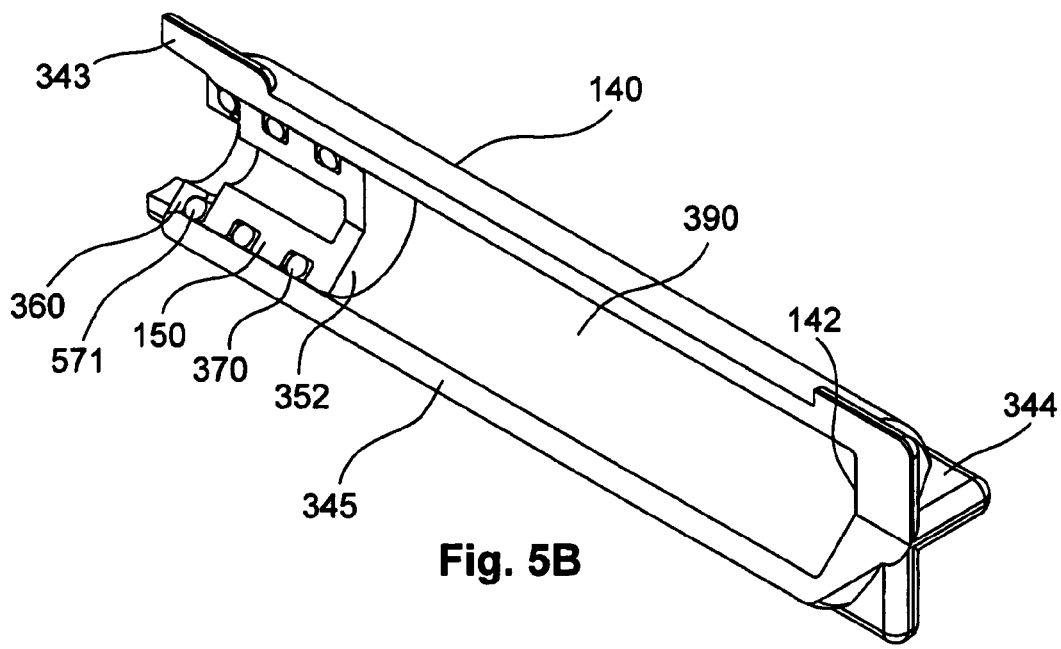
FIG. 5B is a schematic cutaway perspective view of the piston assembly of FIG. 5A.

A fourth example of a water hammer arrester 100 includes an alternative form of piston assembly 140 as illustrated in FIGS. 5A and 5B, which will now be described. This form of the piston assembly 140 is substantially similar to that illustrated in FIGS. 3F and 3G, in which the piston assembly 140 includes a chamber 390 filled with a pressurised gas acting as the resilient medium. Similar features will be referenced using similar reference numbers throughout the following description.

The primary difference in the piston assembly 140 of FIGS. 5A and 5B, compared to that of FIGS. 3F and 3G, resides in the particular inclusion of an additional O-ring 571 positioned between the retaining ring 360 and the piston 150. The O-ring 371 acts as a buffer or cushion to reduce impact loads between the retaining ring 360 and the piston 150 in use, caused by the restoring force provided on the piston 150 by the pressurised gas within the chamber 390. This in turn can help to prevent damage to the retaining ring 360 and piston 150 and may allow plastic materials with low impact strength to be used to form those components.

Such an arrangement may also be used in versions of the piston assembly 140 including different resilient media, such as the embodiment including a spring 480 positioned inside the chamber 390 as shown in FIGS. 4D and 4E. The O-ring 371 can thus reduce impacts caused by the restoring force provided on the piston 150 by the spring 480, in cases where the spring is in a normally compressed state when the piston assembly 140 is assembled.

However, it will be appreciated that spring loaded versions of the piston assembly 140 may be assembled such that the spring 480 is not normally compressively loaded, in which case impacts caused by the restoring force may already be reduced, such that an O-ring 371 may not be warranted. Similarly, in pressurised gas versions of the piston assembly 140, the degree of pressurising can be adjusted to reduce the impacts between the piston 150 and the retaining ring 360 in use, such that an O-ring 371 may not be necessary.

Nevertheless, the O-ring 371 allows the use of resilient media which provide relatively higher restoring forces which can improve the water hammer arrester performance and/or the use of components formed with materials having lower impact resistance which may allow cheaper manufacture.

Further details of the piston 150 and the retaining ring 360 used in the example piston assembly 140 of FIGS. 5A and 5B can be seen in FIGS. 5C to 5G. In this case, the retaining ring 360 includes an open groove 565 about its circumference to allow the O-ring 371 to be fitted in a suitable position between the piston 150 and the retaining ring 360. Other details are substantially similar to those already described with reference to FIGS. 3K to 3O.

Figure 6A:
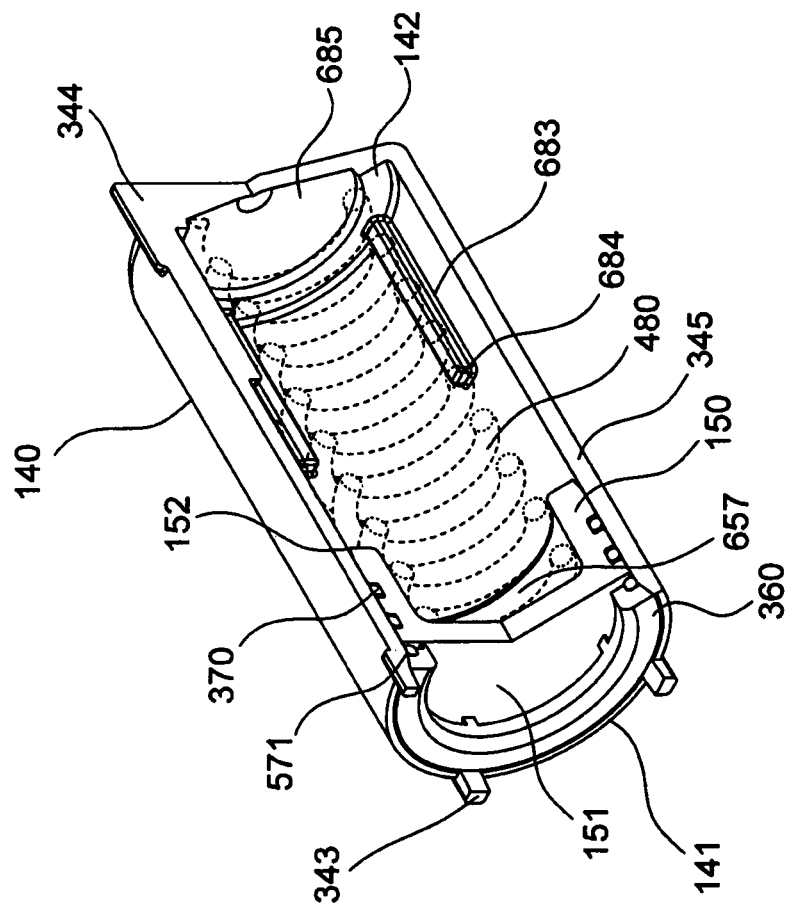
FIG. 6A is a schematic cutaway perspective view of a piston assembly of a fifth example of a water hammer arrester.

A fifth example of a water hammer arrester 100 can be provided with a further alternative form of spring loaded piston assembly 140 as illustrated in FIGS. 6A to 6C. The piston assembly 140 of this example has similar operation to that described with reference to FIGS. 4D and 4E, but with a different configuration of spring 480, piston 150 and housing 345 which allows the piston assembly to have a reduced overall length whilst having a comparable range of piston motion.

In this example, the piston 150 includes a relatively large central recess 657, formed in the second end 352 of the piston, within which an end of the spring 480 can be located. The other end of the spring 480 is located in a shallow central recess 685 at the closed end 142 of the piston assembly 140.

The piston assembly 140 in FIG. 6A also includes a plurality of longitudinal ribs 683 projecting inwardly from the inner surface of the housing 345, rather than a central stop 481 (as per the piston assembly 140 of FIGS. 4D and 4E).

When the piston 150 moves towards the closed end 142 of the piston assembly 140 in use, an outer annular surface of the second end 352 of the piston 150 (surrounding the central recess 657) comes into contact with end surfaces 684 of the longitudinal ribs 683 before the spring 480 is compressed beyond desirable limits. It will be appreciated that this will provide a similar stopping functionality as provided by the central stop 481 shown in FIGS. 4D and 4E, to thereby prevent over compression of the spring.

However, the particular arrangement in this example allows the spring 480 to be located such that it extends inside the volume of the piston 150, thus allowing the overall length of the piston assembly 140 to be reduced. It will also be appreciated that this arrangement also allows for easier manufacture of moulded components.

As can be seen in FIGS. 6B and 6C, which show further details of the piston assembly 140 of FIG. 6A, the central recess 657 in the second end 352 of the piston means that the piston 150 can have a flat surface at the first end 351 and yet still have an effectively hollowed construction to provide similar manufacturing advantages as for the piston 150 discussed with reference to FIGS. 3K to 3O.

In this example, the retaining ring 360 is also fitted with an O-ring 571 as described above for FIGS. 5A to 5G.

Other than the features described above, the piston assembly 140 is generally of a similar design as described for earlier examples, and similar reference numerals have been used to indicate similar features.

A sixth broad example of a water hammer arrester 100 will now be described with reference to FIG. 7. As can be seen, this example is similar to the broad form of the water hammer arrester 100 described with reference to FIG. 1, and similar reference numerals have thus been used to indicate similar features. This example further includes optional features which may be suitably provided in versions of the water hammer arrester 100 having a thin walled metallic construction.

The piston assembly 140 includes an inwardly projecting retaining feature 766 positioned at the open end 141, for retaining the piston 150 within the piston assembly 140. The retaining feature 766 is suitably provided by inwardly deforming the piston assembly 140 housing near the open end 141. It will be appreciated that a thin walled metallic housing can be cold worked through roll grooving, crimping, dimpling or any suitable process to provide this retaining feature 766 in a cost effective manner.

FIG. 7 also illustrates the option of providing a reduction in cross sectional area from the body 110 to the water pipeline connection points at the inlet 120 and the outlet 130. This reduction can be selected to ensure that the cross sectional areas of the inlet 120 and the outlet 130 are substantially similar to the cross sectional area of the passageway between the piston assembly 140 and the body 110 through which the water flows in use. When the body 110 is formed from a metal tube or the like, the body 110 can be formed to include this reduction in cross sectional area using a single component. Alternatively, separate adapter components can be provided to achieve an effective reduction in cross sectional area.

It will be appreciated that, whilst the features shown in FIG. 7 are particularly well suited to thin walled metallic construction, these may also be provided in water hammer arresters formed from plastic or any other suitable materials.

A seventh example of a water arrester 100, particularly having a thin walled metallic construction, will now be described with reference to FIGS. 8A to 8C. The water arrester 100 of this example may be suitably manufactured from copper tubing or otherwise formed from any other suitable metal tubing or metal structure formed from metal sheet, and it will be appreciated that this example illustrates further desirable implementation features further to the broad example of FIG. 7.

In this example, the body 110 is formed from a length of copper tubing in which the inlet 120 and the outlet 130 at the ends have reduced cross section diameters compared to the cross section throughout the central portion of the body 110. The inlet 120 and outlet 130 may be formed using known tube end forming techniques to provide reduced ends 821, 831, following placement of the piston assembly 140 within the body 110. It will be appreciated that the reduced ends 821, 831 can be formed using any other suitable fabrication techniques.

The body 110 further includes a plurality of inwardly protruding dimples 811, 812, which are provided for positioning the piston assembly 140 inside the body 110. As can be more readily appreciated with reference to FIGS. 8B and 8C, there are two depths of dimples 811, 812.

Shallow dimples 811 having a first, relatively shallow depth are provided for locating the piston assembly 140 radially and are thus provided in longitudinal positions registering with the housing 345 of the piston assembly 140 and protrude inwardly sufficiently to engage the housing 345. Other, deeper dimples 812 having a relatively greater depth are provided to restrain the piston assembly 140 axially, and accordingly these dimples 812 are provided to register with the ends 141, 142 of the piston assembly and protrude beyond the housing 345.

Figure 8A:
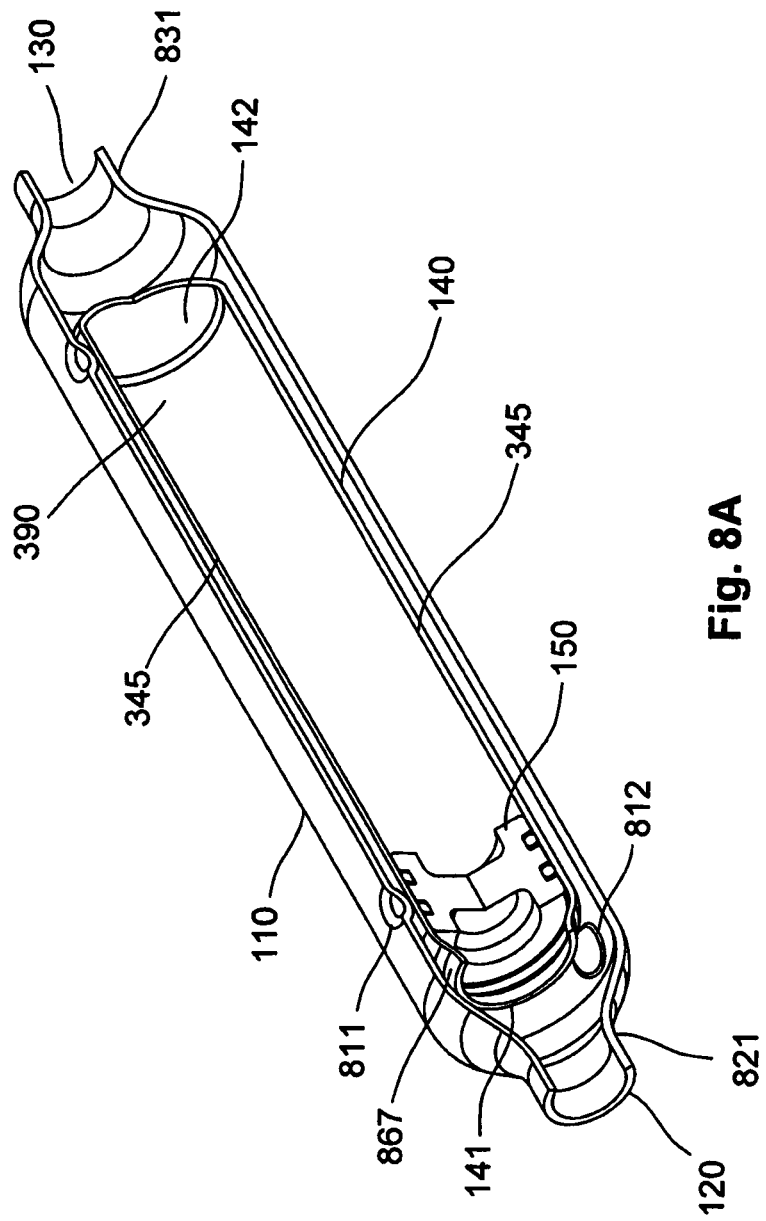
FIG. 8A is a schematic cutaway perspective view of a seventh example of a water hammer arrester.
Figures 8B, 8C:
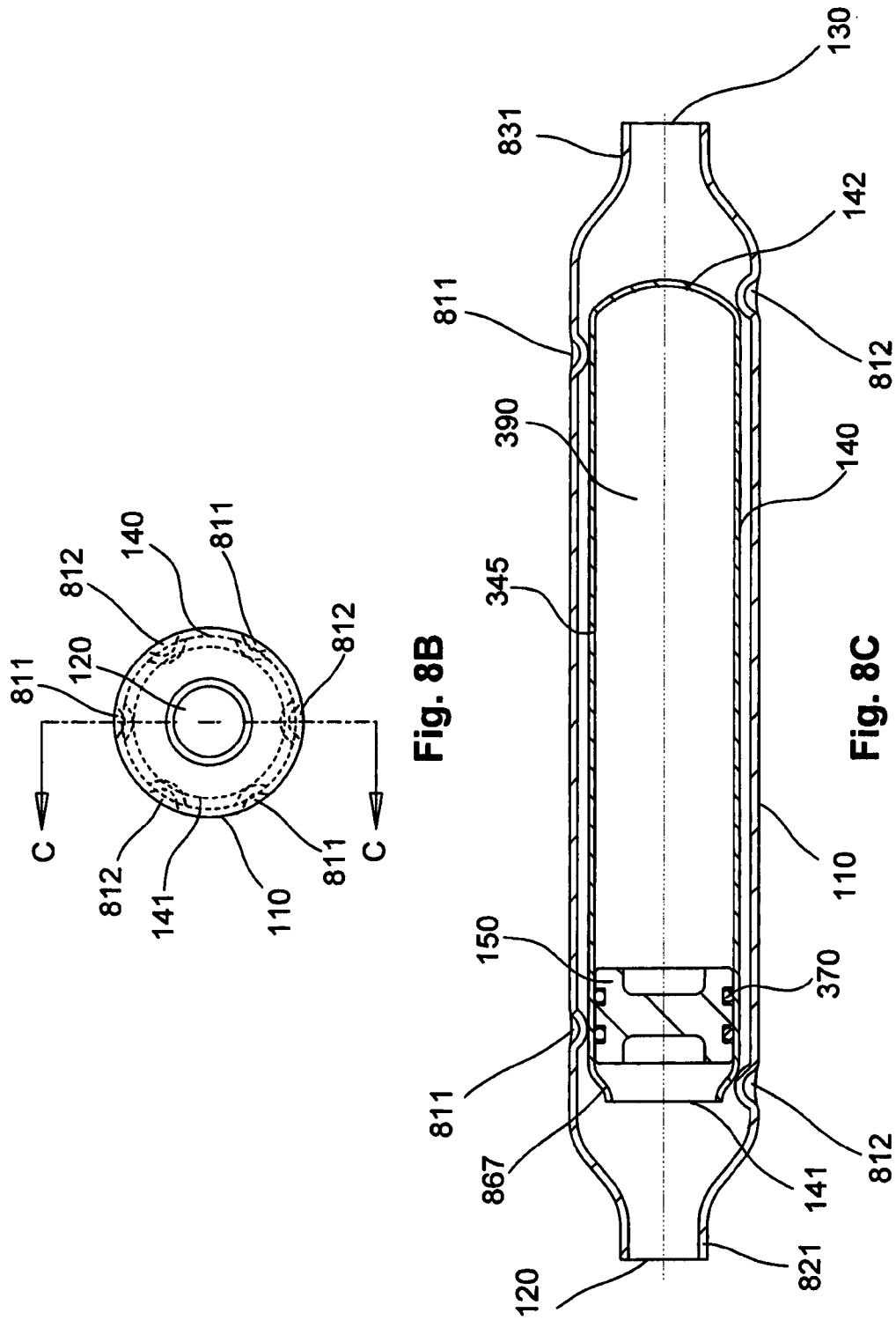
FIG. 8B is a schematic front view of the water hammer arrester of FIG. 8A.
FIG. 8C is a cross-sectional side view of the water hammer arrester of FIG. 8A.

A plurality of dimples 811, 812 of each depth are distributed radially as can be seen in FIG. 8B. In this example, three dimples 811, 812 are arranged radially at four longitudinal positions along the body 110, to provide suitable location and retention of the piston assembly 140, although it will be appreciated that different dimple arrangements may be used. In alternative examples, other inwardly protruding features such as radius grooves or the like may be provided instead of dimples to provide similar locating and retaining functionality.

In this example, the piston assembly 140 is of the pressurised gas type, in which the housing 345 defining the chamber 390 is also formed using copper tubing.

The open end 141 of the piston assembly 140 is rounded inwardly in this case to form a retaining lip 867. The retaining lip 867 provides a means of retaining the piston 150 within the piston assembly 140 without requiring a separate retaining feature such as the retaining ring 360 used in previously described examples.

The closed end 142 of the piston assembly 140 can be formed using any known techniques for closing an end of a copper tube, including cold end closing techniques and brazing/soldering/welding of a cap onto the end of the tube.

In this case, the piston 150 has a symmetrical construction which is simplified compared to earlier examples, since the inward rounding of the open end 141 to form the retaining lip 867 removes the need for providing separate piston retaining features (which have been formed integrally with the piston 150 in previous examples). Nevertheless, the piston 150 may be formed in a similar fashion to those previously described, for example as a moulded plastic component.

It will be appreciated that the end forming processes to provide the reduced ends of the body 110 and the housing 345 may be performed at appropriate stages of the assembly of the components of the water hammer arrester. For example, the open end 141 of the piston assembly can be formed by rounding the housing 345 after the piston 150 is installed into the chamber 390 along with gas at a desired pressure, and at least one of the reduced ends 821, 822 can be formed after installation of the completed piston assembly 140 into the body 110 to complete the assembly.

The particular configuration of the water hammer arrester illustrated in FIGS. 8A to 8C even further reduces the number of components, whilst remaining relatively easy to manufacture and assemble.

In a further optional variation of the above example, the dimples 811, 812 may be omitted, and the piston assembly 140 may be positioned within the body 110 using lugs 343, 344 similar to those described above in previous examples. The lugs 343, 344 may be conveniently provided as end caps installed at the respective ends 141, 142 of the piston assembly 140, as discussed above with reference to FIGS. 3C and 3D. In this case, the lugs 343 may be suitably configured to engage the reduced ends 821, 831 to longitudinally restrain the piston assembly 140.

In view of the above examples, it will be appreciated that the water hammer arrester 100 described herein provides a means of reducing water hammer in a water pipeline with reduced space requirements and improved performance when compared to conventional water hammer arresters, due to the capability to install the water hammer arrester 100 in an in-line arrangement.

Furthermore, by utilising relatively inexpensive plastic manufacturing methods, and reducing the complexity and number of parts, a functional water hammer arrester 100 can be provided at a reduced cost compared to conventional water hammer arrester devices. The piston assembly 140 is also capable of being provided with suitable dimensions to fit inside a standard pipe section, to allow the water hammer arrester functionality to be provided without requiring a customised body 110 component. It will be appreciated that this allows improved flexibility in the scenarios in which the water hammer arrester can be installed.

In contrast with conventional in-line water hammer arrester arrangements, the piston 150 of the water hammer arrester 100 is positioned directly in the water flow path, and therefore kinetic energy from the flowing body of water and pressure waves are allowed to directly impinge upon the piston 150. It will be appreciated that this arrangement results in improved attenuation of water hammer in the water pipeline.

It should be understood that the use of the term "medium" throughout the above description is not intended to particularly restrict the contents of the chamber 390 of the piston assembly 140 or the manner in which the restoring force is provided to the piston 150. Accordingly, it will be appreciated that the term "medium" includes a compressed gas, such as compressed air, or any other resilient member, such as a spring, as exemplified in the above described embodiments.

It should also be understood that the generally cylindrical shapes of the body 110 and housing 345 of the piston assembly 140 of the above described embodiments are merely examples of the possible shapes which may be convenient for a water hammer arrester 100 in accordance with the present invention, and are not intended to be limiting. For example, the housing 345 may have a square cross section. In one example, the corners of a suitably dimensioned square housing 345 may act as lugs 343, 344, to thereby allow the piston assembly 140 to be positioned and/or restrained inside a body 110, such as a cylindrical pipe. Accordingly, it will be appreciated that any combination of shapes can be used to provide the functionalities described above.

Persons skilled in the art will appreciate that numerous variations and modifications will become apparent. All such variations and modifications which become apparent to persons skilled in the art, should be considered to fall within the spirit and scope that the invention broadly appearing before described.

The claims defining the invention are as follows:

1. A water hammer arrester comprising:
   a) a body connecting a water inlet and a water outlet; and
   b) a piston assembly positioned in the body, said piston assembly including
      an elongate housing having an open end and a closed end;
      a piston positioned in said housing, the piston being slidably moveable along at least part of a length of the housing; and
      a retaining member positioned at the open end of the housing, the retaining member retaining the piston in the housing,
      wherein the piston assembly is positioned in the body to allow water to flow from the inlet to the outlet between the piston assembly and the body along an open annular passage way, the piston assembly being adapted to absorb pressure variations in the water pipeline to thereby at least partially reduce water hammer in the water pipeline in use, wherein the body and the piston assembly are configured to allow water to flow substantially around the piston assembly and wherein the inlet and the outlet are positioned at opposite ends of the body such that the water hammer arrester is provided in an in-line arrangement, and
      wherein the body is configured to retain the piston assembly between the water inlet and the water outlet, and wherein the body is provided with the piston assembly for installation into the water pipeline as a complete assembly.

2. A water hammer arrester according to claim 1, wherein at least a portion of the body is in the shape of an elongate hollow cylinder.

3. A water hammer arrester according to claim 2, wherein the elongate housing of the piston assembly is dimensioned to fit within an inner wall of the body and wherein at least a portion of the housing has a substantially cylindrical outer surface, the outer surface of the housing having a diameter that is less than a diameter of the inner wall of the body.

4. A water hammer arrester according to claim 3, wherein the body and the piston assembly define respective axes, and wherein the piston assembly is positioned coaxially inside the body to thereby define an annular water passageway between at least part of the inner wall of the body and at least part of the outer surface of the housing of the piston assembly and wherein a cross sectional area of the water passageway is preferably equal to or greater than a cross sectional area of the water pipeline.

5. A water hammer arrester according to claim 3, wherein the housing of the piston assembly includes a plurality of lugs for positioning the piston assembly in the body.

6. A water hammer arrester according to claim 5, wherein at least some of the plurality of lugs are positioned at one end of the housing and at least some of the plurality of lugs are positioned at another end of the housing the plurality of lugs protruding outwardly from the outer surface of the housing to thereby maintain a separation between the outer surface and the inner wall of the body, wherein the plurality of lugs are preferably arranged circumferentially about the housing and each of the plurality of lugs protrude outwardly from the outer surface by substantially the same distance to thereby substantially radially centralise the piston assembly inside the body.

7. A water hammer arrester according to claim 3, wherein the inner wall of the body includes at least one circumferential step for longitudinally restraining the piston assembly in the body and wherein the at least one circumferential step protrudes inwardly from the inner wall of the body and the housing of the piston assembly includes a plurality of lugs protruding outwardly from the outer surface of the housing, each of the plurality of lugs having ends extending longitudinally from the housing, and wherein the at least one circumferential step is configured such that the ends of the lugs abut the at least one circumferential step to thereby axially restrain the piston assembly in the body.

8. A water hammer arrester according to claim 3, wherein the inner wall of the body includes a plurality of inwardly protruding dimples for positioning the piston assembly in the body, the dimples radially centralising the piston assembly inside the body and/or longitudinally restraining the piston assembly in the body.

9. A water hammer arrester according to claim 1, wherein a second end of the piston defines a chamber at the closed end of the housing, such that a volume of the chamber varies with movement of the piston.

10. A water hammer arrester according to claim 9, wherein the piston is biased towards the open end of the housing by a medium in the chamber, wherein the medium preferably includes at least one of a pressurised gas, pressurised air, a spring and a resilient member.

11. A water hammer arrester according to claim 9, wherein the piston includes at least one of the following:
   a) at least one seal for substantially preventing water from leaking into the chamber;
   b) at least one circumferential groove for retaining at least one seal;
   c) a circumferential wiper edge at the first end of the piston for substantially preventing contaminants from entering the chamber along an inner surface of the housing; and,
   d) a recess at the second end of the piston for interfacing with a spring in the chamber.

12. A water hammer arrester according to claim 9, wherein the piston assembly includes a spring positioned inside the chamber between the piston and the closed end of the housing, the housing of the piston assembly preferably including a stop for preventing over compression of the spring when the piston is moved towards the closed end, the stop including a protrusion extending axially from the closed end of the housing into the chamber and/or one or more protrusions extending inwardly from the inner wall of the housing into the chamber.

13. A water hammer arrester according to claim 1, wherein the retaining member comprises a retaining ring.

14. A water hammer arrester according to claim 13, wherein the retaining ring and piston are molded as a single part, and wherein the retaining ring is connected to the piston by frangible tabs configured to allow the retaining ring and piston to separate from one another upon initial use of the water hammer arrester and wherein the piston assembly preferably includes an O-ring positioned between the retaining ring and the piston.

15. A water hammer arrester according to claim 1, wherein the retaining member comprises an inwardly projecting retaining feature integral with the housing and positioned at the open end of the housing for retaining the piston in the housing.

* * * * *